(12) United States Patent
Botto et al.

(10) Patent No.: US 8,336,180 B2
(45) Date of Patent: Dec. 25, 2012

(54) METHOD OF FORMING OR REPAIRING DEVICES CONFIGURED TO COMMINUTE MATERIAL

(75) Inventors: Ivo Botto, Catasauqua, PA (US);
Kranthi Prakash Peddeti, Whitehall, PA (US); Curtis Erwin Prothe, Greensburg, PA (US); Andrew W. Vargo, Scottdale, PA (US)

(73) Assignee: Flsmidth A/S (DK)

( * ) Notice: Subject to any disclaimer, the term of this patent is extended or adjusted under 35 U.S.C. 154(b) by 289 days.

(21) Appl. No.: 12/892,975

(22) Filed: Sep. 29, 2010

(65) Prior Publication Data

US 2012/0073105 A1    Mar. 29, 2012

(51) Int. Cl.
*B23P 6/00* (2006.01)

(52) U.S. Cl. ............ 29/402.01; 29/402.03; 29/402.04; 29/402.06; 29/402.08; 29/505; 29/520; 29/521; 29/525; 403/282

(58) Field of Classification Search ............ 29/402.01, 29/402.03, 402.04, 402.06, 402.07, 402.08, 29/402.12, 402.13, 402.14, 402.16, 402.21, 29/520, 521, 525, 525.01, 895.1, 895.3, 505; 241/30; 403/282

See application file for complete search history.

(56) References Cited

U.S. PATENT DOCUMENTS

| | | | |
|---|---|---|---|
| 252,755 A | 1/1882 | Gates | |
| 1,225,061 A | 5/1917 | Schultz | |
| 1,589,302 A | 6/1926 | Middelboe | |
| 3,137,937 A | 6/1964 | Cowan et al. | |
| 3,233,312 A | 2/1966 | Cowan et al. | |
| 3,474,520 A | 10/1969 | Yu Takizawa et al. | |
| 3,813,758 A | 6/1974 | Araki | |
| 3,868,761 A | 3/1975 | Apalikov et al. | |
| 3,900,147 A | 8/1975 | Apalikov et al. | |
| 3,955,766 A | 5/1976 | Chang | |
| 3,964,717 A | 6/1976 | Hansen | |
| 4,133,371 A | 1/1979 | Birch et al. | |
| 4,357,287 A | 11/1982 | Schonert | |
| 4,369,926 A | 1/1983 | Rasmussen et al. | |
| 4,485,974 A | 12/1984 | Lass | |
| 4,582,260 A | 4/1986 | Folsberg | |
| 4,703,897 A | 11/1987 | Beisner et al. | |
| 4,844,321 A | 7/1989 | Matsuzawa et al. | |
| 4,848,683 A | 7/1989 | Kawatsu | |
| 4,879,890 A | 11/1989 | Hardwick | |

(Continued)

OTHER PUBLICATIONS

U.S. Appl. No. 12/766,110.

(Continued)

*Primary Examiner* — Jermie Cozart

(74) *Attorney, Agent, or Firm* — Jeffrey A. Sharp; Aaron M. Pile; Daniel DeJoseph

(57) ABSTRACT

A method for repairing a crushing device or other device configured to comminute material includes the steps of removing at least one first insert from a portion of a crushing body such that at least one opening is formed in the portion of the crushing body, positioning at least one second insert in the at least one opening formed by the removing of the at least one first insert, positioning a force application mechanism adjacent to the at least one second insert and the portion of the crushing body, and actuating the force application mechanism to deform the portion of the crushing body to attach the at least one second insert to the portion of the crushing body. The one or more first inserts may be damaged and the one or more second inserts may be used to replace the one or more damaged first inserts. The force application mechanism is preferably explosive material. A method of forming a wearable surface is also disclosed.

26 Claims, 14 Drawing Sheets

U.S. PATENT DOCUMENTS

| | | | |
|---|---|---|---|
| 5,203,513 A | 4/1993 | Keller et al. |
| 5,242,098 A | 9/1993 | Hardwick |
| 5,269,477 A | 12/1993 | Buchholtz et al. |
| 5,318,213 A | 6/1994 | Strickland et al. |
| 5,400,945 A | 3/1995 | Bergmann et al. |
| 5,470,012 A | 11/1995 | Linse et al. |
| 5,531,396 A | 7/1996 | Kinnunen et al. |
| 5,755,033 A | 5/1998 | Gunter et al. |
| 5,823,450 A | 10/1998 | Folsberg |
| 5,967,431 A | 10/1999 | Stafford et al. |
| 6,523,767 B1 | 2/2003 | Ramesohl |
| 7,300,708 B2 | 11/2007 | Gigliotti, Jr. et al. |
| 7,517,580 B2 | 4/2009 | Mulligan et al. |
| 7,523,794 B2 | 4/2009 | Hall et al. |
| 7,530,485 B1 | 5/2009 | Brasher et al. |
| 2008/0286598 A1 | 11/2008 | McCracken et al. |

OTHER PUBLICATIONS

International Search Report and Written Opinion (Feb. 9, 2012).

METHOD OF FORMING OR REPAIRING DEVICES CONFIGURED TO COMMINUTE MATERIAL

FIELD OF INVENTION

The present invention relates to methods of forming or repairing devices configured to comminute material. More particularly, the invention relates to methods of forming or repairing crushing bodies such as rollers, tables, anvils, or dies of devices configured to comminute material. Examples of such comminution devices may include roller presses, roller mills, crusher devices, cone crushers, gyratory crushers, mills, and grinding devices.

BACKGROUND OF THE INVENTION

Mills, presses, crushers, and other crushing devices used to comminute material often include a crushing body or multiple crushing bodies that are configured to impact material to crush the material. Crushing bodies are often configured to grind the material between a surface of the crushing body and the surface of another crushing body such as the surface of a table, anvil or wall. Examples of such crushing devices may be appreciated from U.S. Pat. Nos. 252,755, 1,225,061, 1,589,302, 3,955,766, 3,964,717, 4,369,926, 4,485,974, 4,582,260, 5,203,513, 5,823,450, and 6,523,767. As another example, roller presses may have one or more rollers configured to impact material to grind the material. Each roller may include a wear surface. The wear surface may be attached to the roller. For instance, the wear surface of the roller may be welded to the roller.

A wear surface typically experiences wear as material is comminuted by the wear surface. After a period of time, the wear surface may experience wear sufficiently that it is unable to crush material or experiences a great reduction in crushing ability. For example, portions of the wear surface may erode or become broken during use and subsequently requires replacement or repair.

Some wearable surfaces used in devices configured to comminute material may be appreciated from U.S. Pat. No. 5,269,477. Such wearable surfaces include insert members embedded in a surface of a cylindrical press roll. The insert members may project radially into the surface of the roll. The insert members are configured to crush material. Rollers with such a wear surface may require a relatively intensive amount of labor to embed the insert members into the surface of a roller. These types of rollers may also have a relatively limited capacity for insitu repair, such as repair while the rollers are on equipment in a production line of a manufacturing facility.

Other wearable surfaces used in crushing devices include hexagonal tiles, such as the tiles disclosed in U.S. Pat. No. 5,755,033. A tiled surface can include tiles that have gaps or recesses between the tiles. The tiles are affixed to a base material and are harder than the base material. Such tiled wearable surfaces are usually not capable of being repaired while the wearable surface is positioned in a plant or processing line for grinding material. The inability to conduct in-situ repairs on such products can be a major hindrance for a manufacturer and can greatly increase the cost of maintaining or repairing such devices.

Previously filed U.S. patent application Ser. No. 12/766,110 which has been allowed discloses crushing devices that utilize crushing bodies that have wearable surfaces formed from explosion forging processes and explosion welding processes. The owner of the rights in the present application also owns the rights to U.S. patent application Ser. No. 12/766,110 and this present application has some inventors that are also the inventors named in U.S. patent application Ser. No. 12/766,110. The entirety of U.S. patent application Ser. No. 12/766,110 is incorporated by reference herein.

The crushing bodies disclosed in U.S. patent application Ser. No. 12/766,110 may be sized and configured for use in a wide array of comminution devices such as crushing devices or grinding devices. Among other things, that application discloses a method of making crushing bodies by explosively forging hard inserts within at least one metal structure to form a crushing body. However, to subsequently repair such devices may require replacement of segments of a crushing body. The replacement of such segments is an improvement over many current methods used to repair embodiments of crushing devices. That being said, we have determined that it would be even more preferred to permit a repair of damaged inserts on an even smaller scale, such as on an individual insert basis. This is particular true when it is often the case that individual inserts in a crushing body may be damaged. The ability to repair individual inserts could be much preferred over the replacement of segments of a crushing body in some applications since it would take less time to perform such repair work. Such decreased time would also reduce the cost associated with that repair work as it would reduce the amount of down time the crushing device being repaired would experience.

A method of repairing a wearable surface is needed that may permit in-situ repairs of wearable surfaces for crushing bodies of a crushing device and other devices configured to comminute material. Preferably, such a wearable surface is able to permit in-situ repairs that can take place while equipment is in a product line of a manufacturing facility and can permit relatively short lead times for manufacturing.

A method of forming a wearable surface of a crushing body is also needed. Preferably, the wearable surface formed from that method can also subsequently permit the use of the method for repairing that surface.

SUMMARY OF THE INVENTION

A method of repairing a device configured to comminute material includes removing at least one first insert from a portion of a crushing body such that at least one opening is formed in the portion of the crushing body. The portion of the crushing body may be comprised of metal. The at least one first insert may be harder than the metal of the portion of the crushing body. Positioning at least one second insert in the at least one opening formed by the removing of the at least one first insert may then be performed. The at least one second insert may be harder than the metal of the portion of the crushing body. Explosive material may be positioned adjacent to the one or more second inserts and the portion of the crushing body. The explosive material may be ignited to deform the portion of the crushing body to attach the at least one second insert to the portion of the crushing body.

Preferably, the explosive material is comprised of one or more explosives. The explosive material may be in any of a number of forms, such as liquid, emulsion, gel, solid, castable form, sheet form, plasticite, powder, or plastic.

The one or more second inserts may be mechanically interconnected to the portion of the crushing body after the explosive material is ignited so that there is no intramolecular bond between the one or more second inserts and the portion of the crushing body. The portion of the crushing body may be a portion of the wearable surface of the crushing body. That wearable surface may be configured to comminute material that includes at least one of rock, ore, minerals, stone, and agglomerated material.

Embodiments of the method may include additional steps. For instance, an embodiment of the method may include the step of positioning the one or more second inserts in at least one metal sleeve prior to the positioning of the one or more second inserts in the one or more openings formed by the removing of the at least one first insert. The one or more metal sleeves may be sized and configured to be positioned within those one or more openings. The positioning of the one or more second inserts may also be performed such that one or more gaps are formed between the one or more metal sleeves and the portion of the crushing body. The one or more gaps may subsequently be at least partially filled with a deformed portion of the crushing body that is deformed for attaching the one or more second inserts to the crushing body via the ignited explosive material. Each of the at least one gap is preferably between 0.0625 inches and 0.125 inches in width. In alternative embodiments of the method that may not utilize such metal sleeves, the one or more second inserts may be positioned in the one or more openings so a gap is formed between each second insert and the portion of the crushing body defining the opening in which that second insert is positioned. Each gap may have any of a number of different geometries or shapes.

Preferably, each gap encircles at least a portion of the periphery of a second insert or a sleeve in which that second insert may be positioned. For instance, if the second insert is cylindrical in shape, the gap formed by that insert is preferably an elongated annular shaped gap that surrounds at least a portion of the surface area of the second insert. In the event the second insert is positioned in a sleeve, that gap may be positioned directly around at least a portion of the surface area of the sleeve while also being adjacent to and enclosing at least a portion of the periphery or surface area of the second insert.

Preferably, the one or more first inserts are removed from the crushing body by drilling at least a portion of the one or more first inserts. Such drilling may utilize a machine tool or a diamond bit. Of course, other mechanisms or apparatuses may be used to remove the first inserts. For instance, it is contemplated that the first insert may be removed via a pneumatic chisel or pneumatic hammer or by using other mechanism or tools.

The crushing body of the device for comminuting material is preferably a roller of a roller mill, a roller of a roller press, a liner of a cone crusher, a bowl of a cone crusher, a die of a mill, a table of a mill, or a crushing body of a crushing device that is configured to impact material to comminute the material.

Preferably, all the steps of the method may be performed while the device configured to comminute material is positioned in a material processing facility, a manufacturing facility, or in a crushing circuit of a manufacturing process. Of course, embodiments of the method may be utilized in other locations or at other times. For example, embodiments of the method may be used to correct defects that are detected when a crushing body is being made for inclusion into a comminution device to be sold to a customer that desires to buy such a device for use in material processing operations run or overseen by that customer.

Embodiments of the method may also include the step of providing a localized stress relief to a portion of the crushing body after the explosive material is ignited and the one or more second inserts are attached to the portion of the crushing body. The localized stress relief may be provided in a number of ways. For example, a thermal pad may be used to provide such stress relief. The thermal pad may be controlled to provide a desired heat treatment to a local area of the crushing body adjacent to the one or more second inserts.

Embodiments of the method may also include the step of covering explosive material with a shield such that the shield is able to direct the energy or force provided by the explosive material when the explosive material is ignited. For instance, the shield may be positioned adjacent to the crushing body to direct the force or energy provided by the explosive material toward the portion of the crushing body to deform that portion of the crushing body for attaching the one or more second inserts to the crushing body. The shield is preferably composed of metal, but may alternatively be composed of a composite material, a ceramic material, or other material.

The shield may have any of a number of different shapes or configurations. For example, the shield may be a box-like structure or disc-like structure that includes an outer wall, an inner wall, and sound absorbing or force absorbing material between the inner and outer wall. Such sound absorbing material or force absorbing material may include foam, rubber material, polymeric material, or other material that may absorb or distribute some portion of energy or force that may be exerted from an energy application mechanism, such as a detonated explosive material. The inner wall may define an opening for covering a portion of the wearable surface adjacent to the recess in which the second insert is positioned.

The shield may be positioned manually or using tools or machines such as, for instance, a machine arm, a pole, or other mechanism that may be used for positioning the shield. After the explosive material has been ignited, the shield may be moved away from the crushing body. Embodiments of the shield may include a mechanism, device or portion for retaining the explosive material and may also include an ignition mechanism for igniting the explosive material.

A method of forming a wearable surface is also provided. One embodiment of the method of forming the wearable surface includes positioning inserts at least partially within sleeves, positioning the sleeves and inserts adjacent to a first metal structure, positioning a second metal structure adjacent to the inserts, sleeves and the first metal structure such that there is a gap between the second metal structure and the first metal structure, positioning at least one explosive material adjacent to a second side of the second metal structure, and igniting the at least one explosive material to deform a portion of the first metal structure to attach the inserts and sleeves to the first metal structure to form the wearable surface. The inserts may be harder than the first metal structure. The second metal structure may include a first side and a second side that is opposite the first side. The first side of the second metal structure may face the gap.

The inserts may be attached to the first metal structure such that no intramolecular bonding between the first metal structure and the inserts take place. Intermolecular bonding or metallurgical bonding between the sleeves and the first metal structure may occur via the ignited at least one explosive material.

In some embodiments of the method of forming a wearable surface, the second metal structure may be moved away from the wearable surface. The first metal structure may be a plate, a tube, or a generally cylindrical structure. The second metal structure may be moved away from the wearable surface by cutting or hitting the second metal structure to move the second metal structure away from the wearable surface.

The wearable surface may be cut, bent, or flattened into a desired shape. The wearable surface may also be tested to ensure it meets certain specifications, such as customer or design specifications. The testing, bending, cutting and flattening may be configured to permit the wearable surface to be attached to a grinding mechanism.

Another method of repairing a device configured to comminute material is also provided. Embodiments of that method of repairing a device configured to comminute material may include removing at least one first insert from a portion of a crushing body such that at least one opening is formed in the portion of the crushing body. The portion of the crushing body may be comprised of metal. The at least one first insert may be harder than the metal of the portion of the crushing body. Positioning at least one second insert in the at least one opening formed by the removing of the at least one first insert may then be performed. The at least one second insert may be harder than the metal of the portion of the crushing body. A force application mechanism may be positioned adjacent to the one or more second inserts and the portion of the crushing body. The force application mechanism may be actuated to deform the portion of the crushing body to attach the at least one second insert to the portion of the crushing body. Preferably, the deformation of the portion of the crushing body is plastic deformation.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of devices configured for the comminution of material, crushing bodies of such devices, and methods of repairing such devices are shown in the accompanying drawings.

DETAILED DESCRIPTION OF PRESENT PREFERRED EMBODIMENTS

Figure 1:
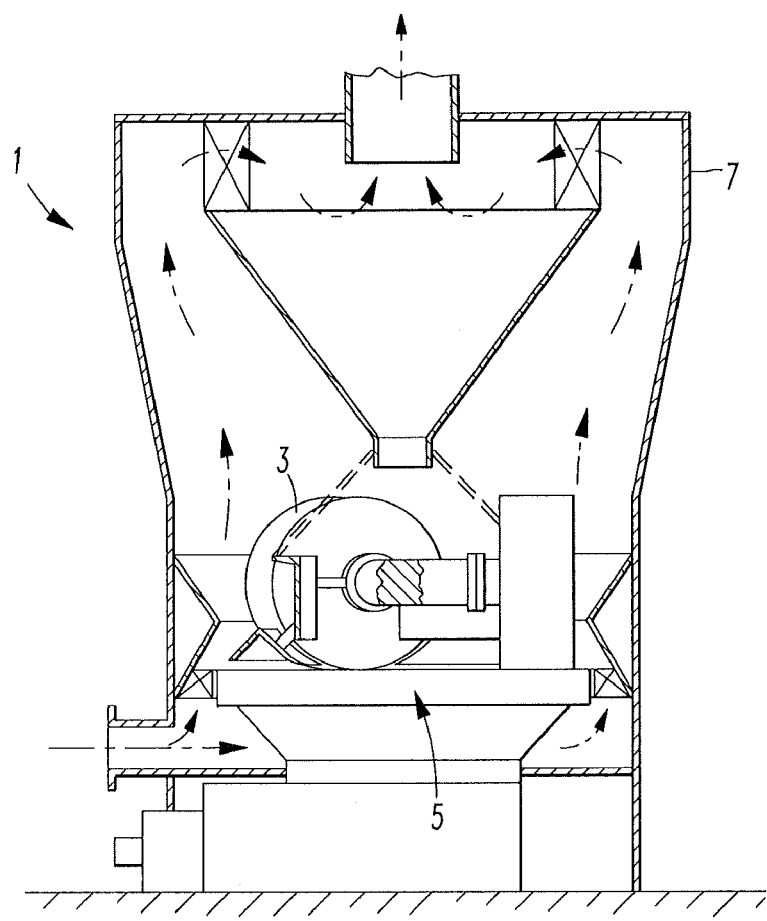
FIG. 1 is a cross sectional view of a present preferred embodiment of a roller press.

Referring to FIG. 1, a roller press 1 may include a roller 3 that is moveable adjacent to a moveable surface 5 for comminuting material such as ore, minerals, rock, stone, agglomerated material, material used for cement manufacturing, material used for concrete manufacturing such as ready mix concrete manufacturing or other material. The roller 3 and moveable surface 5 may be positioned within a housing or frame 7 and may be the moveable surface of a moveable table or moveable anvil. The roller 3 may have a wearable surface for the comminution of material. The moveable surface 5 may also have a wearable surface. The wearable surfaces may include a semi-autogenous layer.

Figure 2:
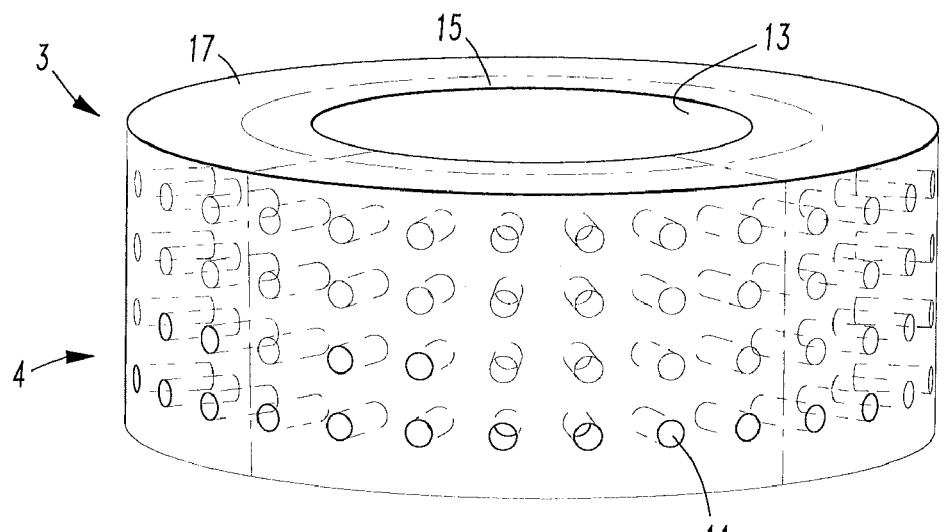
FIG. 2 is a perspective view of a present preferred embodiment of a roller that may be used in embodiments of roller mills or roller presses. Portions of inserts positioned in the roller are shown in dotted line.

As may be appreciated from FIG. 2, a present preferred roller 3 may include a wearable outer surface 4. The crushing body of the roller may include an outer portion 17 and an inner portion 15. The inner portion 15 and outer portion 17 may be integrally attached together. The inner portion 15 may define an inner channel 13. Inserts 13 may be positioned in the outer portion 17 of the roller 3. The inserts are preferably composed of a metal or other material that is harder than the material of the outer portion 17 of the roller. The inserts 11 may also be harder than the material of the inner portion 15 of the roller 3. For example, the inserts preferably have a harder Brinell value, Rockwell value, Vickers value, Knoop value, Leeb Rebound value, or durometer value than the hardness rating of the material of the outer portion 17 of the roller 3.

Preferably, the body of the roller 3 is composed of metal such as carbon steel or other steel. The outer portion 17 and inner portion 15 of the roller may be composed of the same metal or may be composed of different metals.

The inserts 11 are preferably composed of industrial made diamonds, diamonds, tungsten carbide, tungsten-carbide cobalt, cemented carbide, ceramic material or composite material. Inserts may be obtained from suppliers such as Kennametal, Hardmetal Solutions, or other suppliers. Of course, inserts may alternatively be made and used by the company fabricating the roller press 1.

Figure 3:
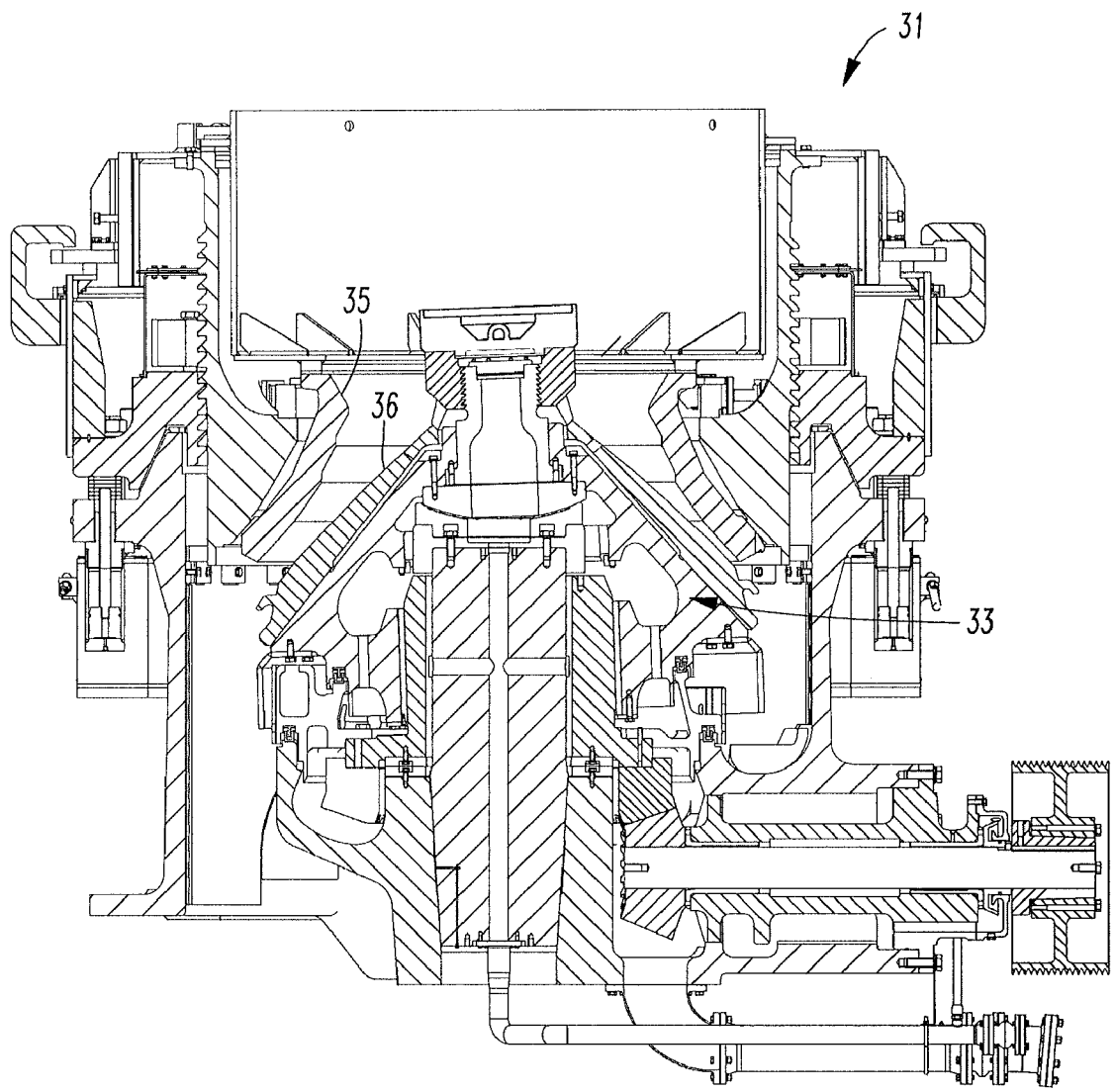
FIG. 3 is a cross sectional view of a present preferred embodiment of a cone crusher.

As may be appreciated from FIG. 3, a cone crusher 31 may include a bowl 35 and a crushing head 33 that includes an outer liner 36. The liner 36 and crushing surface of the bowl 35 may include wearable surfaces. The wearable surfaces may include inserts arranged along the wearable surface to form a semi-autogenous layer of the wearable surface. The crushing head may move to crush material between the liner 36 and the bowl 35. The inserts may be positioned in the liner or the bowl similar to the inserts 11 positioned in the roller 3 of the roller press 1 discussed above.

The material the cone crusher 31 may be configured to crush, grind or otherwise comminute may include ore, minerals, rock, stone, agglomerated material, material used for cement manufacturing, material used for concrete manufacturing such as ready mix concrete manufacturing or other material.

Figure 4:
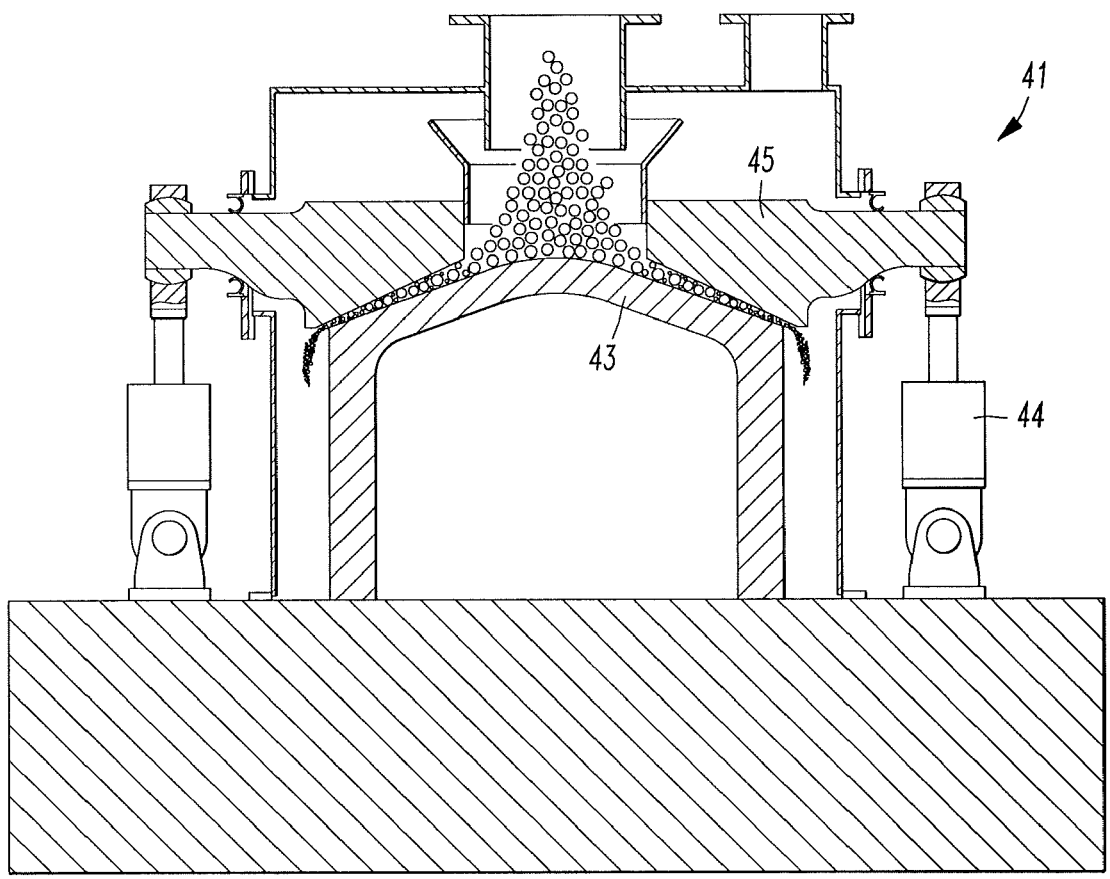
FIG. 4 is a cross sectional view of a present preferred embodiment of a mill.

As may be seen in FIG. 4, a mill 41 may include a die 45 that is moveable relative to a table 43 via actuators 44. The actuators 44 may be, for example, hydraulic cylinders or other linear moving actuators configured to move the die 45 to crush material between the die 45 and the table 43. It should be appreciated that table 43 may be considered a crushing body and that die 45 may also be considered a crushing body. The crushing surface of the table 43 may include a wearable surface. The crushing surface of the die 45 may also include a wearable surface. Either of these wearable surfaces or both of these wearable surfaces may include inserts similar to the inserts 11 in the body of the roller 3. The wearable surface of the die 45 may include a semi-autogenous layer. The wearable surface of the table 43 may also include a semi-autogenous layer.

Figure 5:
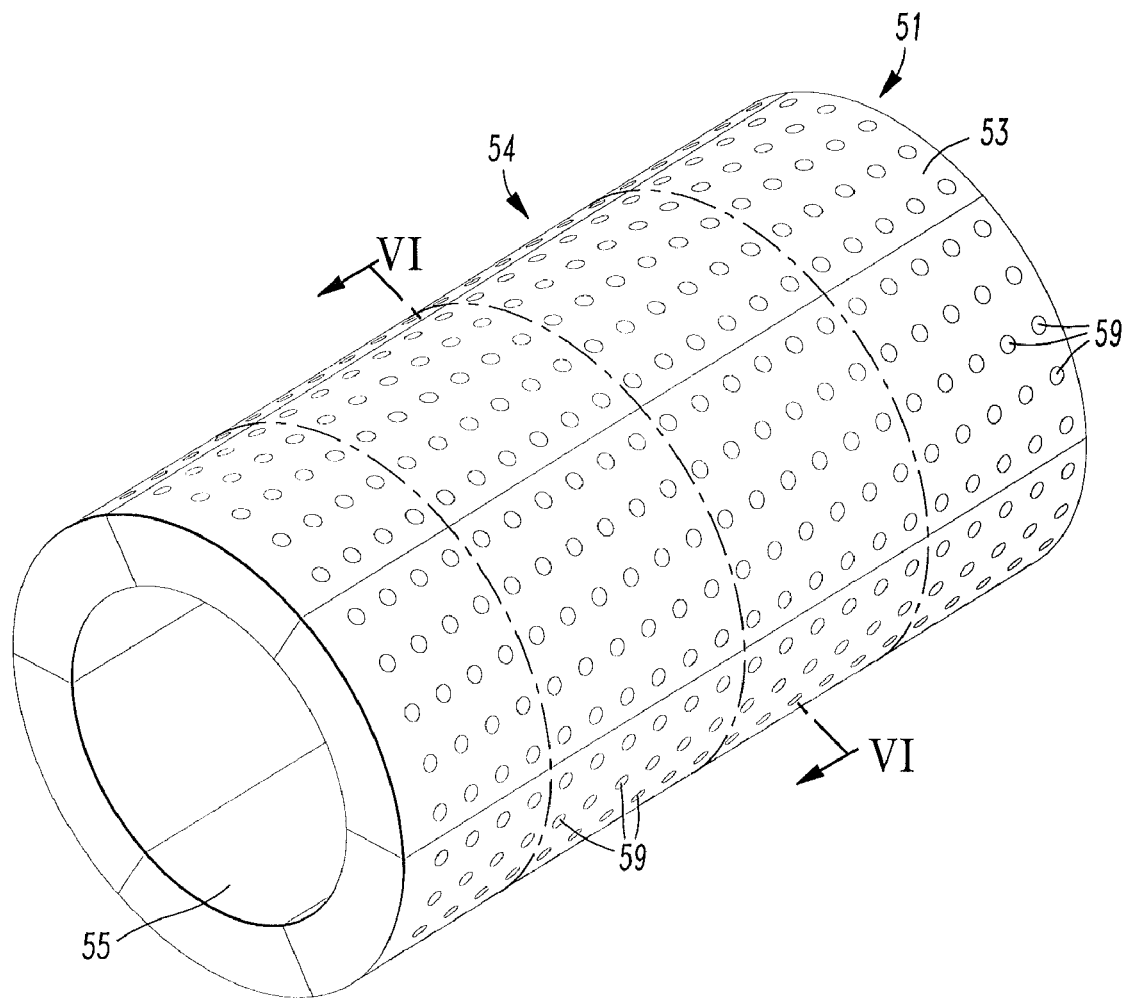
FIG. 5 is a perspective view of a first present preferred embodiment of a crushing body of a device configured to comminute material.
Figure 6:
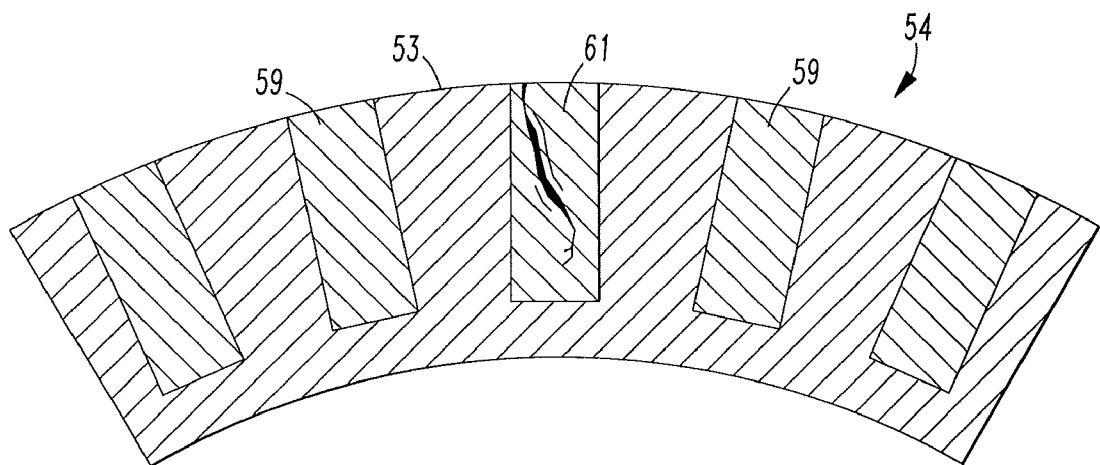
FIG. 6 is a cross sectional view of the first present preferred embodiment of the crushing body taken along line VI-VI in FIG. 5, which illustrates a damaged insert.
Figure 7:
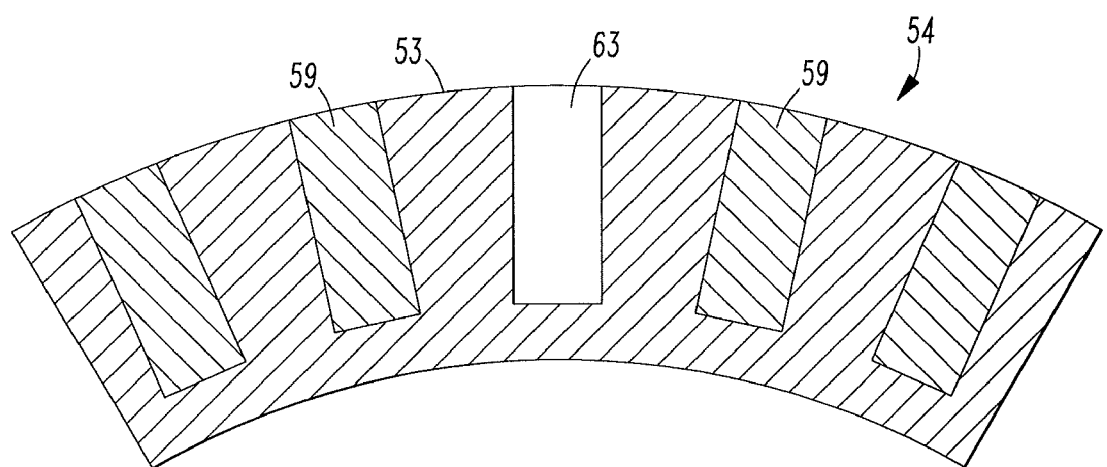
FIG. 7 is a cross sectional view similar to the view shown in FIG. 6 illustrating the first present preferred embodiment of the crushing body after a damaged insert has been removed from a portion of the crushing body.
Figure 8:
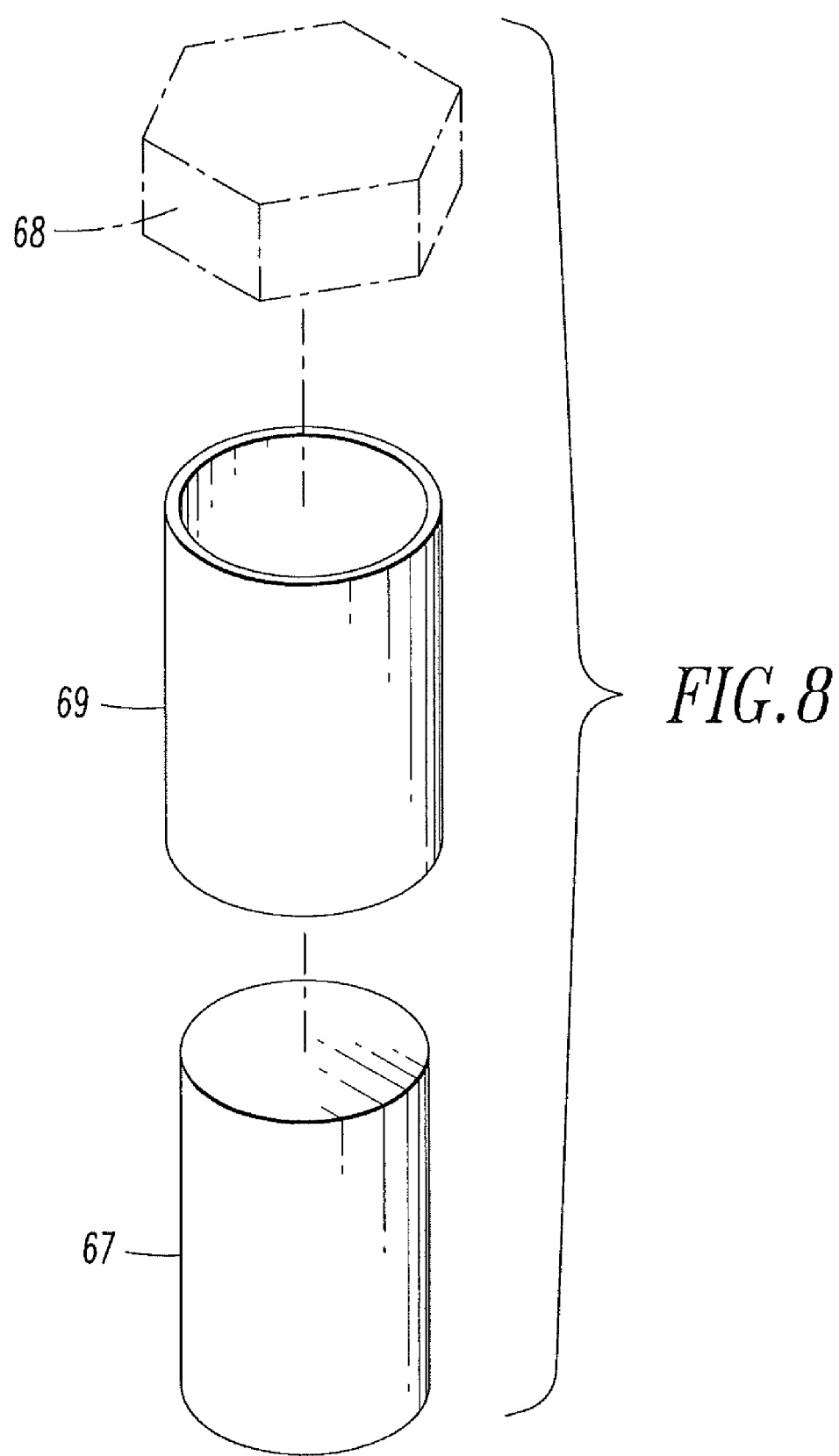
FIG. 8 is an exploded view illustrating a present preferred embodiment of a replacement insert being positioned in a present preferred embodiment of a sleeve for the replacement insert. A cap that may be an integral portion of the sleeve or that may be a component that is attached to the sleeve is shown in dotted line in FIG. 8.
Figure 9:
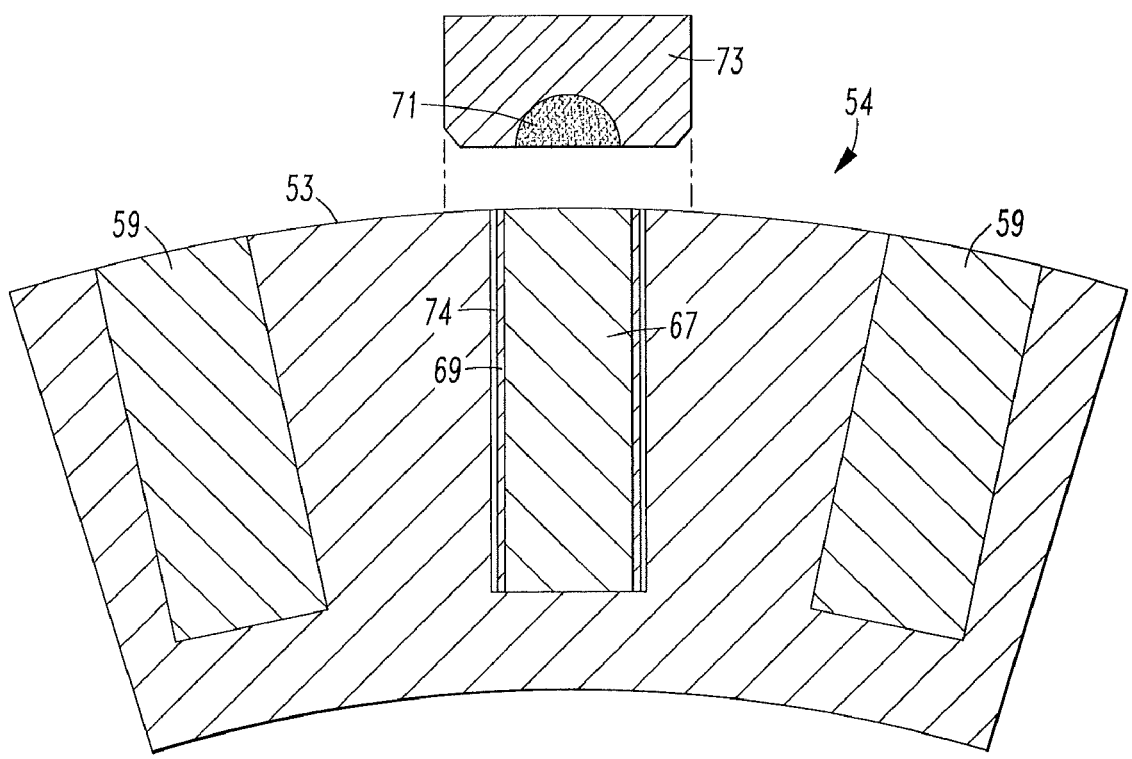
FIG. 9 is a cross sectional view similar to the views of FIGS. 6 and 7 illustrating a present preferred embodiment of a replacement insert in a sleeve being positioned in a portion of a crushing body. A first present preferred embodiment of a shield and a first present preferred embodiment of explosive material are also illustrated in FIG. 9. The shield and explosive material are shown in the process of being moved toward the crushing body.
Figure 10:
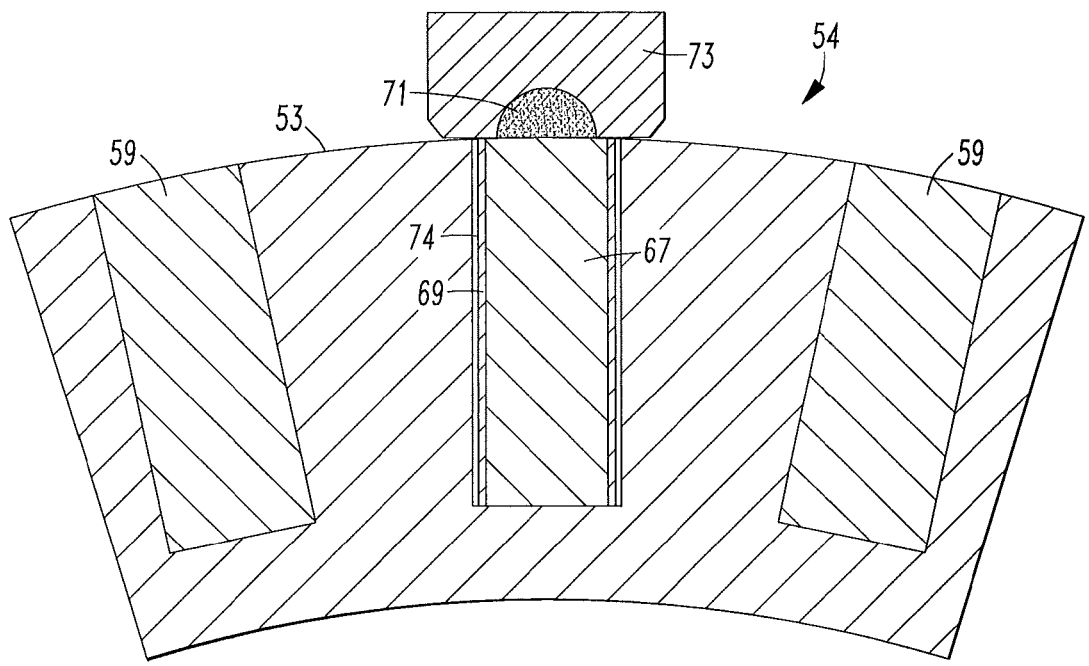
FIG. 10 is a cross sectional view similar to the views of FIGS. 6, 7 and 9 illustrating the first present preferred embodiments of the shield and explosive material being positioned adjacent to the undamaged replacement insert and a portion of the crushing body.
Figure 11:
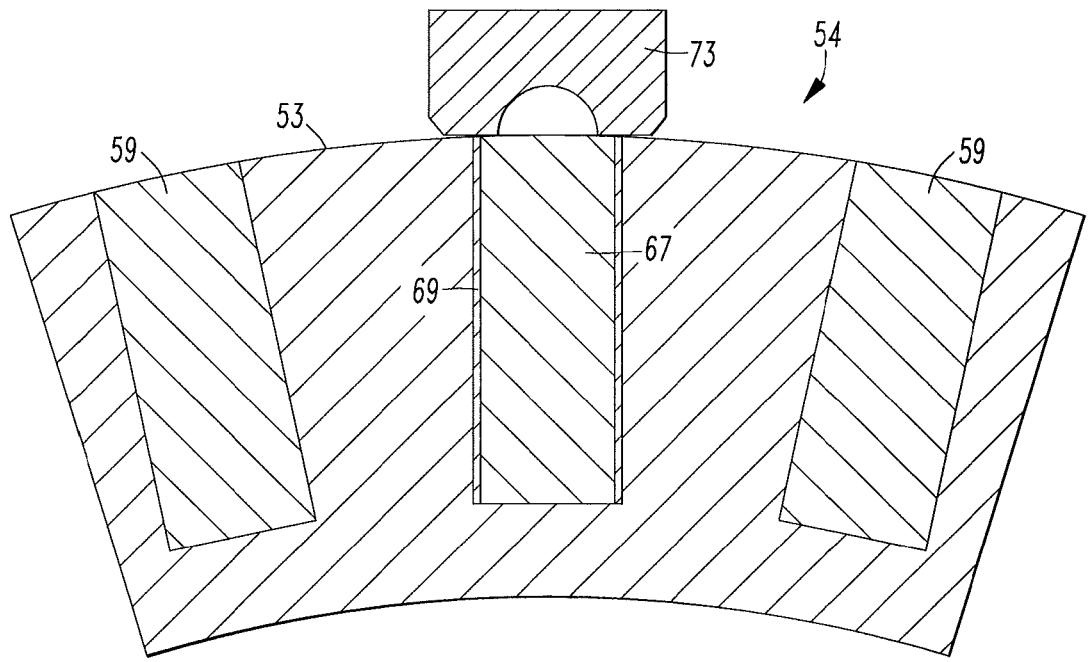
FIG. 11 is a cross sectional view similar to the views of FIGS. 6, 7, 9 and 10 illustrating the first present preferred embodiment of the shield after the explosive material has been ignited and before the shield is moved away from the portion of the crushing body.
Figure 12:
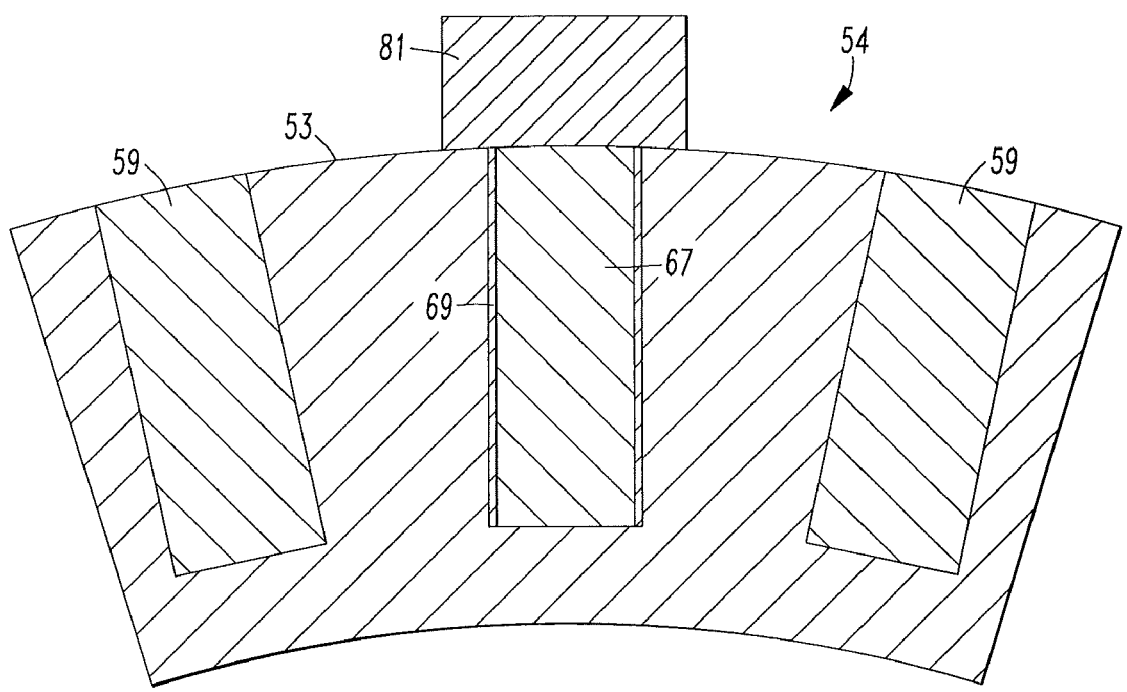
FIG. 12 is a cross sectional view similar to FIGS. 6, 7, 9, 10, and 11 illustrating a present preferred embodiment of a thermal pad being positioned to provide localized stress relief to a portion of the crushing body.
Figure 13:
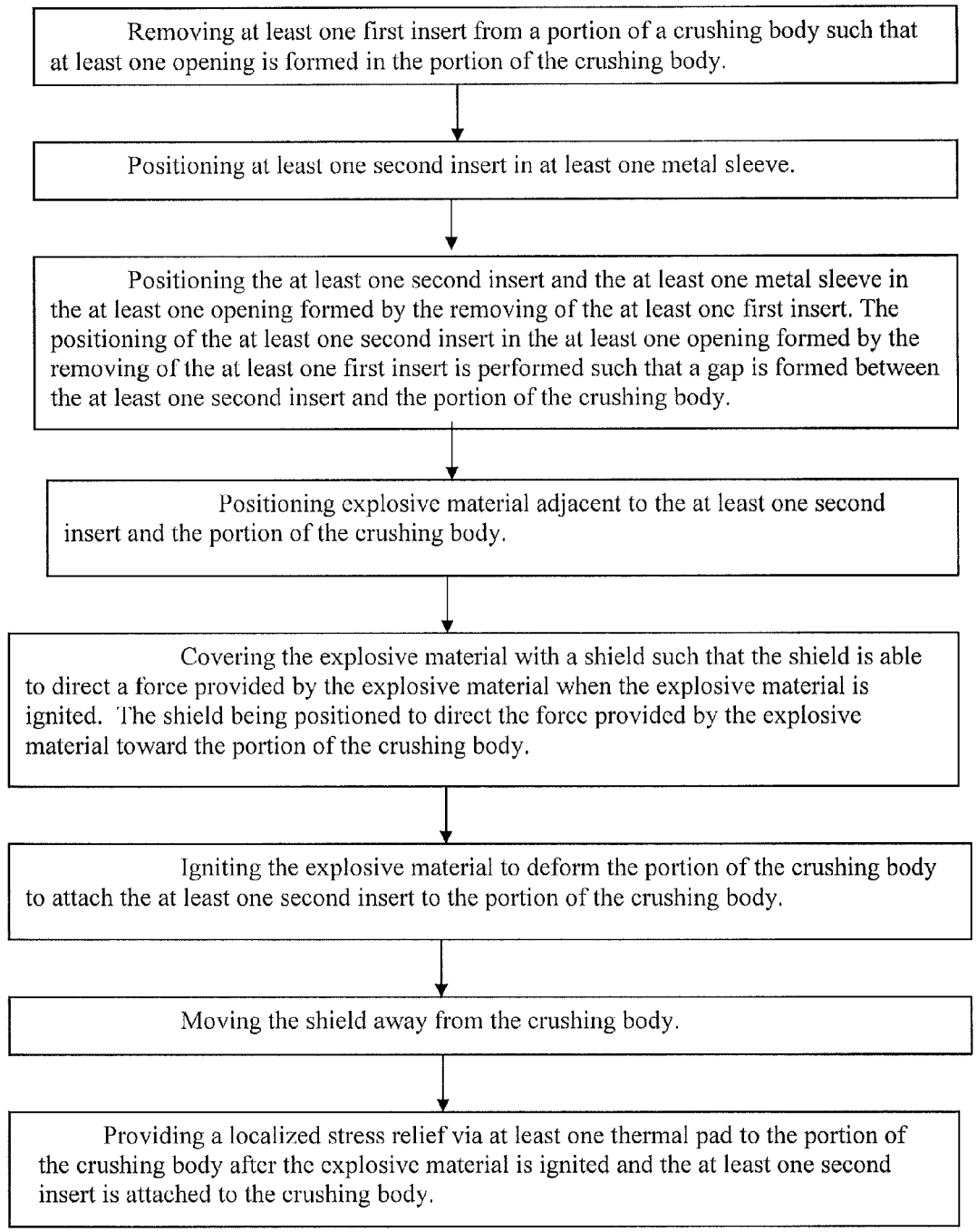
FIG. 13 is a flow chart illustrating a present preferred method of repairing a crushing body of a device configured to comminute material while that device is positioned within a crushing circuit of a material processing feasibility, manufacturing process or other building or facility.

Referring to FIG. 5, a present preferred crushing body 51 is illustrated. The crushing body is shown as a generally cylindrical structure. It should be understood that embodiments of the crushing body may have any of a number of geometries or shapes that are sized and configured for use in different crushing devices or other devices configured to comminute material. For instance, a crushing body may have a rectangular or polygonal shape of a die of a mill. As another example, a crushing body may have a flat, relatively thin rectangular structure for defining a wearable surface of a table or anvil of a mill. Various different types of crushing bodies may also be appreciated from U.S. patent application Ser. No. 12/766, 110. The entirety of U.S. patent application Ser. No. 12/766, 110 is incorporated by reference herein.

The crushing body 51 includes a wearable surface 54 that is defined by an outer portion 53 of the crushing body 51. Inserts 59 are positioned in the outer portion 53 of the crushing body. The inner portion of the body 51 may define a channel 55 that extends through the body 51. The inserts 59 are preferably harder than the material of the outer portion 53. Preferably, the material of the outer portion 53 is metal, such as steel or carbon steel. The inserts 59 are preferably composed of tungsten carbide material or other hard material. The inserts 59 may be positioned such that a portion of each insert extends out of the crushing body so that a portion of each insert is positioned above or exterior to the outer surface of the outer portion 53 of the crushing body 51. It is also contemplated that the inserts may be fully recessed from the outer surface of a crushing body in alternative embodiments of crushing bodies.

If one of the inserts of the crushing body 51 becomes damaged while the crushing device to which the crushing body is attached is operating in a crushing circuit of a manufacturing facility or other facility, the crushing device may provide a lower than desired throughput of crushed material. Such damage may occur by cracking or otherwise damaging an insert. Such a damaged insert 61 may need to be replaced to repair the crushing body. It is also possible that multiple damaged inserts 61 may exist after a crushing body has been used in crushing operations for some period of time. It may be desirable to repair all of these damaged inserts.

Traditionally, it is often very difficult to repair comminution devices without removing the device from a crushing circuit or facility for repair. In some cases, it may even be necessary to ship the crushing device to a particular facility for the crushing body of that device to be repaired. Such conventional repairs can require substantial downtime, which is not desirable to the owner of that equipment. There may also be a substantial cost associated with this downtime such as reduced output or processing capacity or there may be a substantial cost associated with the owning of back-up equipment for avoiding such downtime periods.

To avoid the traditionally experienced substantial downtimes associated with repairing crushing devices or other comminution devices, a new method of repairing damaged crushing bodies has been developed. Embodiments of this new method may be appreciated from FIGS. 7-13.

A damaged insert 61 may be removed from a crushing body to which it is attached. The removal of the damaged insert 61 may be done, for example, by drilling the damaged insert 61 out of the crushing body or by chiseling or hammering that insert out of the crushing body. For instance, a drill, pneumatic chisel, or pneumatic hammer may be utilized to remove the damaged insert 61. The removal of the damaged insert 61 may form an opening 63, or recess in the outer portion 53 of the crushing body. The opening 63 may include an outer mouth that is the top portion of the opening 63 or recess and is open adjacent to the wearable surface 54 of the crushing body 51.

A new replacement insert 67 may be positioned in the opening 63. Preferably, a metal sleeve 69 is also positioned between the insert 67 and the walls of the opening 63. The metal sleeve may be positioned around the replacement insert 67 before or after the replacement insert 67 is positioned in the opening 63. The metal sleeve may be positioned around the replacement insert 67 or within the opening 63 via hydraulic pressure or explosive pressure. For example, a hydraulic piston may be used to push the sleeve 69 into position around the replacement insert 67 after the insert is positioned in the opening 63. Grease or another type of lubricant may also be used to help facilitate the positioning of the replacement insert within the sleeve 69. Of course, other sleeve positioning mechanisms may also be utilized for positioning the sleeve 69 around the replacement insert 67.

The metal sleeve 69 may be sized and configured to fit within the opening 63 to help make positioning the insert in the opening 63 easier. The metal sleeve 69 may also help facilitate attachment of the replacement insert 67 to the outer portion 53 of the crushing body 51. The metal sleeve 69 may be composed of a ductile metal or alloy such as, for example, steel, alloy steel, stainless steel, nickel, nickel alloy, copper, copper alloy, aluminum or aluminum alloy. Of course, in alternative embodiments of the method, a metal sleeve 69 may not be used. For instance, a replacement insert 67 may simply be directly positioned in the opening 63. As another example, a sleeve composed of a different material, such as a composite material may alternatively be used. Preferably, the material of the sleeve 69 is not as hard or as strong as the material of the replacement insert 67.

Embodiments of the sleeve 69 may be formed in any of a number of shapes or sizes. The sleeve 69 may be cylindrical, tubular, generally cylindrical in shape or may be polygonal in shape. For instance, alternative embodiments of the sleeve 69 may be box-like in shape, rectangular in shape, or hexagonal in shape. The sleeve 69 may be uniform in shape or may be tapered as well. Other embodiments of the sleeve 69 may also include an inner diameter that defines the channel of the sleeve in which the replacement insert may be positioned that is uniform in shape and length or that is tapered so that some portions of the channel or wider or narrower than other portions. Preferably, the sleeve 69 and replacement insert 67 are sized and configured to establish a desired stick-out above or below the outermost portion of the crushing body 51 to match the outermost positions of the other inserts 59 in the crushing body so that the replacement insert 67 is able to relatively quickly reestablish an autogenous layer or semi-autogenous layer of the crushing body or wearable surface of the crushing body.

The sleeve 69 is preferably sized and shaped to receive at least a portion of the insert and provide clearance for deformation and locking within the opening 63 of the crushing body. Such clearance may be provided by a gap that may be formed between the sleeve 69 and the portion of the crushing body adjacent to the opening 63 that defines the opening 63. The material properties and shape or structure of the sleeve may be configured to have any of a number of different deformation characteristics such as yield strength, strain hardening rate, etc. to facilitate retention within the opening 63. The channel of the sleeve may include a surface finish such as a coating, smoothness or a roughness that may help facilitate receiving the insert within the sleeve 69. Grease or another type of lubricant for instance may also be used to help facilitate the insertion of the replacement insert 67 into the sleeve 69. The sleeve may also include additional features such as grooves, chamfers, holes, or apertures to facilitate positioning within the opening 63 and receiving the replacement insert. For instance, the apertures may be shaped to allow entrapped gas to escape when the replacement inset is being positioned in the sleeve 69. Such features may also be configured to help reduce the chance that the replacement insert could be damaged when positioned in the sleeve 69.

Embodiments of the sleeve 69 and replacement insert 67 may be provided as an assembly for ready insertion into a crushing body. Such an assembly may help reduce production time, ensure process repeatability, and ensure that replacement inserts are easily stored for ready use to replace a damaged insert. It should also be understood that multiple sleeve and insert assemblies may be prepared in a group or as a segment dependent on the scope and area or required repair. For instance, if multiple damaged inserts exist, multiple sleeves and replacement inserts may be assembled such that the replacement inserts are at least partially positioned in the respective sleeves.

Embodiments of the sleeve 69 may also include a cap 68 that may be attached to an end of the sleeve 69. It is also contemplated that embodiments of the sleeve may include a cap 68 on each end of the sleeve 69. The cap 68 may be an integral portion of the sleeve 69 or may be a separate component that is attached to the sleeve 69 via a fastening mechanism such as, for example, welding, adhesives, screws, bolts, other fasteners or other fastening mechanisms. As another example, the cap 68 may be designed with an attachment profile configured to mate or interlock with a mating profile on the sleeve 69 for attaching the cap 68 to the sleeve 69. The cap 68 may be composed of the same metal as the sleeve or may be composed of a different metal or may be composed of other materials, such as a composite material, an alloy or other material. Preferably, the cap 68 is positioned on the outermost end of the sleeve to cover the outermost portion of the replacement insert when that replacement insert 67 is positioned in the opening 63. Such a position of the cover 68 may help the cover protect the replacement insert 67 while the replacement insert 67 is being attached to the crushing body.

The replacement insert 67 and the sleeve 69 may be positioned in the opening 63 such that there is a gap 74 between the replacement insert 67 and the portion of the crushing body that defines the wall and bottom of the opening 63. The gap 74 may have a width. The width of the gap is preferably between 0.0625 inches and 0.125 inches. It should be appreciated that the gap 74 may provide space that may be filled by a deformed portion of the crushing body to mechanically interlock with the replacement insert 67 for attaching the replacement insert 67 to the crushing body. It should be appreciated that the gap 74 may have any of a number of shapes or configurations. For instance, the gap may be an elongated annular shaped gap or may be a gap that is tapered in shape. The gap 74 preferably surrounds or encloses at least a portion of the periphery or surface area of the sleeve 69 and second insert 67. Of course, if a sleeve 69 is not used, the gap 74 may be formed between the crushing body and the second insert 67.

After the replacement insert 67 is positioned in the opening, explosive material 71 is positioned adjacent to the replacement insert 67 and a portion 53 of the crushing body. The explosive material may include one or more explosives. For example, the explosive material may be composed of ammonium nitrate, amatol, guanidine, dynamite, cyclonite, plastic explosives, explosive powder, ammonium nitrate/fuel oil (ANFO), EL819 type explosive material, T200 type explosive material, cyclotrimethylene-trinitramine (RDX) explosive material, Pentaerythritol tetranitrate (PETN) explosive material or other explosive materials or a combination of such explosive materials. The explosive material 71 may have any of a number of suitable forms such as powder, solid, gel, emulsion, liquid, plastic, plasticite, castable form, or sheet form.

The explosive material 71 is sized and configured to provide a sufficient amount of force or energy as a load when the explosive material is ignited to provide a localized deformation of the portion of the crushing body adjacent to the opening 63 to deform that portion of the crushing body to attach the replacement insert 67 to the crushing body. Such deformation may provide a mechanical interlock between the crushing body and the replacement insert 67. Preferably, the amount of explosive material 71 that is utilized provides a small explosive charge so that a very high load and the accompanied deformation may be achieved with limited equipment, tooling and space so that the repair may occur in-situ without the removal of the crushing body, which may minimize the downtime of the crushing device being repaired and reduce the costs associated with the repair.

In alternative embodiments, other force application mechanisms may be used instead of the detonation of explosive material. For instance, a propellant charge, a combustible gas mixture, an electro-magnetic impulse, a high velocity water (or other fluid) pulse, a hydraulic ram, or a compressed gas may be used to apply force to the crushing body to deform the crushing body adjacent to the opening 63 to mechanically interlock with the sleeve 69 and the replacement insert 67. It is contemplated that such applied force may also provide a metallic bond between the sleeve 69 and the deformed portions of the crushing body when the sleeve is composed of a metal.

In embodiments of the method that utilize a metal sleeve 69, such a localized force provided by the explosive material 71 may be configured to also provide a mechanical interlock between the sleeve 69 and the portion of the crushing body adjacent to the opening 63. No intramolecular bonding, or metallurgical bonding between the replacement insert 67 and the metal sleeve 69 or the replacement insert 67 and the crushing body may occur. It is also contemplated that no metallurgical bonding, or intramolecular bonding, may occur between the metal sleeve 69 and the crushing body or that at least some metallurgical bonding, or intramolecular bonding, may occur between the metal sleeve 69 and the crushing body. Whether any metallurgical bonding or intramolecular bonding takes place may be a function of how much force or energy is applied during the deformation of the crushing body for attaching the replacement insert to the crushing body.

Figure 17:
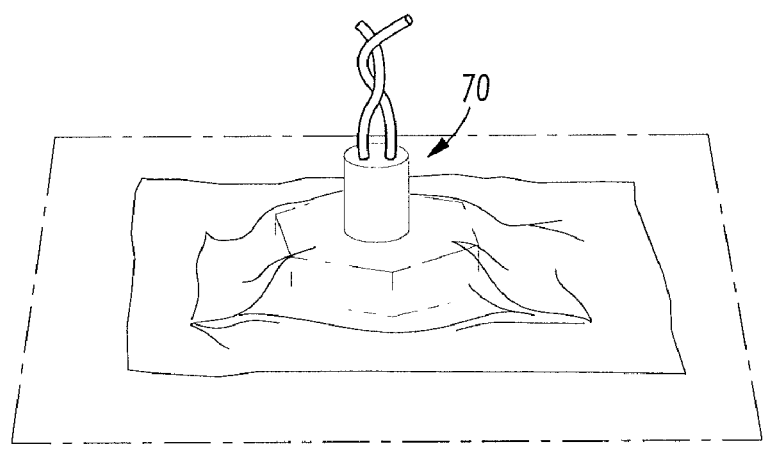
FIG. 17 is a top perspective view of a present preferred sleeve assembly and insert positioned in a recess of a present preferred crushing body with an explosive material and detonator positioned adjacent to the insert and sleeve.
Figure 18:
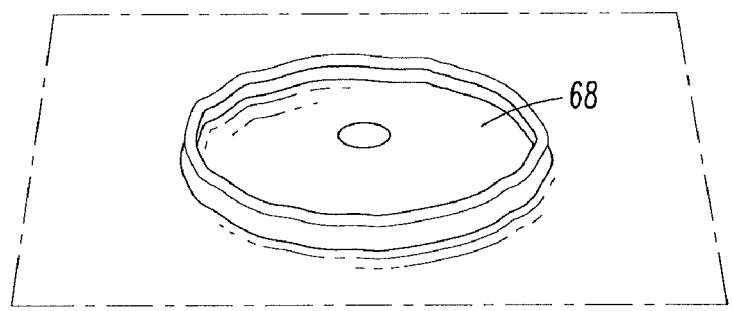
FIG. 18 is a top perspective view of the present preferred sleeve assembly and insert positioned in the recess of the present preferred crushing body illustrated in FIG. 17 after the explosive material was ignited.
Figure 19:
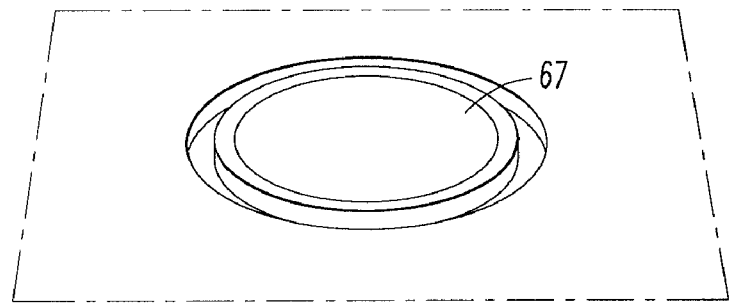
FIG. 19 is a top perspective view of the present preferred sleeve assembly and insert positioned in the recess of the present preferred crushing body illustrated in FIGS. 17 and 18 after the sleeve and cap components of the sleeve assembly were removed. It should be appreciated that the insert shown in FIG. 19 is positioned such that the outermost portion of the insert is about even with the outer portion of the crushing body. It should be understood that the insert may alternatively be positioned such that the second insert is recessed relative to the material of the crushing body or may alternatively extend beyond the outermost portion of the crushing body, but be within the outermost portion of the wearable surface.

As may be appreciated in FIGS. 17-19, the cap portion 68 of an embodiment of the sleeve assembly that may be used in some embodiments of the method may be removed after the explosive material is detonated or a load is applied to plastically deform a portion of the crushing body to attach the replacement insert to the crushing body.

A shield 73 may also be positioned adjacent to the crushing body, the replacement insert 67 within the opening 63, and the explosive material 71. The shield 73 may be composed of metal or other material such as a composite material. The shield may be sized and configured to direct force that may be exerted by the ignited explosive material 73 toward the portion of the crushing body adjacent to the opening 63 to deform that portion of the crushing body. The use of the shield 73 may help reduce the amount of explosive material needed to provide a localized deformation of a portion of the crushing body for attaching the replacement insert to the crushing body. The shield 73 may also help prevent the ignited explosive material from damaging some other portion of the device being repaired.

The shield may be sized to deflect force for attaching one or more replacement inserts. For example, the shield may be sized to cover four adjacent inserts for repairing four inserts positioned next to each other in a portion of the wearable surface. Alternatively, the shield may be sized to only cover one insert for attaching only one replacement insert at a time.

The shield may be positioned manually or via use of a tool such as a pole or robotic arm or other machine or mechanism. The shield may include any of a number of configurations or shapes. In one contemplated embodiment, the shield is box-like, rectangular or cylindrical in shape and has one end that is closed and an opposite end that is open for covering a portion of the wearable surface and the opening 63 and the replacement insert 67 within that opening 63. The structure of the shield may include only one wall or may include an outer wall and an inner wall that extend from the closed end. The space between the inner wall and outer wall may be filled with a material for absorbing energy or sound, such as foam, rubber material, polymeric material, or other material.

In some embodiments of the method, the shield may include a mechanism or portion that is configured to retain the explosive material adjacent to the replacement insert 67 and crushing body so that the explosive material may be ignited after the shield is properly positioned. An ignition mechanism may also be attached adjacent to the explosive material for igniting the explosive material. For instance, that ignition mechanism may be attached to the shield or be provided as an integral portion of the shield.

In yet other embodiments of the shield assembly, the shield 73 may also include an attachment mechanism for releasably connecting to the sleeve 69 so that the positioning of the sleeve 69 and replacement insert may be done at the same time the shield is positioned adjacent to the wearable surface. For such embodiments, the shield, sleeve, and replacement insert may be provided as an assembly that is ready for use without the need to assemble such components prior to performing the repair work. Such an assembly may help further reduce the time needed for repairing a crushing body.

After the explosive material 71 is ignited, the portion of the crushing body adjacent to the opening 63 is deformed to mechanically attach the replacement insert 67 to the crushing body. The shield 73 may then be moved away from the crushing body and the replacement insert 67.

Thereafter, the replacement insert 67 or portion of the crushing body adjacent to the replacement insert may be machined or grinded as needed to remove any portion of the sleeve 69 or cap 68 that may be present so that the replacement insert is exposed and able to directly contact material for crushing that material.

Stress relief may also be provided to the portion of the crushing body that underwent the deformation via the ignited explosive material. If grinding or machining is performed, preferably the stress relief is applied after such grinding or machining.

One example of stress relief may be a localized heat treatment that is applied to the portion of the crushing body that had the replacement insert 67 attached thereto. Such heat treatment may provide stress relief to the portion of the crushing body that was deformed to attach the replacement insert to the crushing body. That heat treatment may be provided by a thermal pad 81 or other stress relief mechanism or heat treatment device.

The thermal pad 81 may be connected to a controller that is configured to control the heat provided by the thermal pad.

The controller may include at least one processor coupled to memory that is configured to run software or one or more applications stored on the memory for controlling operations of the thermal pad. The controller may be configured to control the ramp up time and ramp up heat rate for the application of the heat, the soak time for the heat and the amount of heat provided during the soaking by the thermal pad, and the ramp down time and ramp down rate for the application of the heat treatment via the thermal pad. An operator may provide input or other data to the controller to adjust the heat treatment provided by the thermal pad. The input or other data may be provided via a keyboard, a scanner, an input device, a wireless input device, an electronic message transmission, or other data transmitted to the controller.

Additionally, testing of the replacement insert or of the repaired crushing body may be conducted. Such testing may be conducted before or after the stress relief is applied to the crushing body. The testing may include visual inspection, non destructive testing, ultrasonic testing, physical measurements, and having mechanical tests run. The testing may be configured or designed to ensure that the replacement insert is properly attached to the crushing body.

It should be appreciated that embodiments of the method of repairing a device configured for material comminution may be utilized while the devices are positioned in a manufacturing facility or are positioned within a crushing circuit of a manufacturing facility, material processing facility or other building or facility. Such methods may permit a device to be repaired without having to be removed from the facility, building or crushing circuit in which the device is positioned. Such a repair may be considered an "insitu" repair.

Permitting an insitu repair of a crushing body of a crushing device or other comminution device may permit the repair of that device to occur much more quickly than is currently done utilizing conventional methods. Such insitu repair may reduce the downtime for the device and reduce the costs associated with owning, operating and maintaining such devices. Because the downtime for the device may be greatly reduced, it is also contemplated that owners of such equipment may need to own substantially less back-up equipment, if any, which also helps reduce the costs associated with material processing and/or manufacturing.

It should be appreciated that though the damaged insert 61, other inserts 59 and replacement insert 67 are illustrated as being members having a cylindrical shape, these inserts may all be members having any of a number of shapes. For instance, such inserts may alternatively be members that are cone shaped, tapered, polygonal shaped, circular in shape, spherical in shape or have other shapes. Further, the replacement insert 67 may have a different shape than the damaged insert 61. For instance, the damaged insert 61 could be cylindrical in shape and the replacement insert could be conical in shape, rectangular in shape, or tapered.

It should be understood that the damaged insert 59 and replacement insert may be composed of any of a number of different materials. The damaged insert and replacement insert 67 may be composed of the same material or of different materials. For instance, the replacement insert may be composed of a hard metal, an alloy, a ceramic material, a nitride material, a carbide, an intermetallic material or other material. That material may be harder than the material of the crushing body.

We also conducted testing to evaluate how practical the use of an embodiment of our method may be. In one test, we used a 40 mm diameter, five degree taper carbide insert as a replacement insert. No sleeve was used, and about 20 grams of primasheet 1000 explosive material was detonated to apply a load to the crushing body to attach that replacement insert to the crushing body via plastic deformation. That attachment resulted in providing an attachment that could withstand over 65,000 ponds of push-out load before the insert was pushed out or broken away from the crushing body.

Other tests were also conducted. In one test, a tungsten carbide insert that was 35 millimeters long, had a 40 millimeter diameter, and had a five degree taper, was positioned in a carbon steel sleeve that had a channel that was tapered to receive the entire insert. The insert and sleeve were positioned in a hole that was straight. There was a gap of between 0.18 and 0.30 inches between the sleeve and the wall of the crushing body defining the hole. The crushing body was composed of carbon steel. A hydraulic load of about 100,000 pounds was applied via a hydraulic ram. The load applied by the hydraulic ram plastically deformed the crushing body to attach the insert and sleeve to the crushing body via plastic deformation such that the attached sleeve and insert could withstand over 16,000 pounds of push-out force before breaking away from the crushing body.

In another test, a tungsten carbide insert that was 35 millimeters long, had a 40 millimeter diameter, and had a five degree taper, was positioned in a stainless steel sleeve that had a straight channel sized to receive the entire insert. The insert and sleeve were positioned in a hole that had a reverse taper. There was a gap of between 0.18 and 0.30 inches between the insert and the portion of the crushing body defining the hole. The crushing body was composed of grade 4140 alloy steel. A hydraulic load of about 40,000 pounds was applied via a hydraulic ram. The load applied by the hydraulic ram plastically deformed the crushing body to attach the insert and sleeve to the crushing body via plastic deformation such that the attached sleeve and insert could withstand over 16,000 pounds of push-out force before breaking away from the crushing body.

In yet another set of tests, a tungsten carbide insert that was 35 millimeters long, had a 40 millimeter diameter, and had a five degree taper, was positioned in a carbon steel sleeve that was tapered to receive the entire insert. The insert and sleeve were positioned in a hole that was straight. There was a gap of between 0.18 and 0.30 inches between the sleeve and the wall of the crushing body defining the hole. The crushing body was composed of carbon steel. An explosive load was provided by between 10 and 100 grams of primasheet 1000 explosive material. The explosive material was ignited via a detonator. The load applied by the explosive material deformed the crushing body via plastic deformation to attach the insert and sleeve to the crushing body such that the attached sleeve and insert could withstand over 16,000 pounds of push-out force before breaking away from the crushing body.

In yet another test, a tungsten carbide insert that was 35 millimeters long, had a 40 millimeter diameter, and had a five degree taper, was positioned in a carbon steel sleeve that was tapered to receive the entire insert. The insert and sleeve were positioned in a hole that was straight. There was a gap of between 0.18 and 0.30 inches between the sleeve and the wall of the crushing body defining the hole. The crushing body was composed of grade 4140 alloy steel. An explosive load was provided by between 10 and 100 grams of primasheet 1000 explosive material. The explosive material was ignited via a detonator. The load applied by the explosive material deformed the crushing body via plastic deformation to attach the insert and sleeve to the crushing body such that the attached sleeve and insert could withstand over 16,000 pounds of push-out force before breaking away from the crushing body.

In yet another set of tests, a tungsten carbide insert that was 35 millimeters long, had a 40 millimeter diameter, and had a five degree taper, was positioned in a carbon steel sleeve that was tapered to receive the entire insert. The insert and sleeve were positioned in a hole that was straight. There was a gap of between 0.18 and 0.30 inches between the sleeve and the wall of the crushing body defining the hole. The hole was positioned in the outer diameter of a crushing body. 15 millimeters of the insert extended from the hole out of the crushing body. The crushing body was a roller composed of grade 4140 alloy steel. An explosive load was provided by between 10 and 100 grams of primasheet 1000 explosive material. The explosive material was ignited via a detonator. The load applied by the explosive material deformed the crushing body via plastic deformation to attach the insert and sleeve to the crushing body such that the attached sleeve and insert could withstand over 16,000 pounds of push-out force before breaking away from the crushing body.

The conducted testing showed that a large range of different options are available to provide insitu repair of a crushing body via plastic deformation of a portion of the crushing body that may be provided by a load via a force application mechanism such as a hydraulic ram, explosive material, or other mechanism. For instance, the insert shape or size, sleeve geometry, sleeve material, crushing body structure, crushing body composition, and load application mechanism may affect the different variables necessary to provide an optimum repair or formation solution. That being said, numerous different options that fall within the disclosure provided herein may permit an operable design for most, if not all, potential industrial applications.

The sleeve is preferably configured to have a recess or channel that receives most or all of the insert positioned in the sleeve. The sleeve geometry preferably matches the geometry of the insert. If an explosive material is used, the preferred explosive would be a cast or sheet explosive composition that can be shaped to match the sleeve configuration adjacent to at least the outer portion of the hole in which the sleeve and insert are positioned. Preferably, the amount of load that is applied via a hydraulic mechanism, such as a hydraulic ram is between 40,000 pounds and 100,000 pounds. The explosive material that may be alternatively utilized preferably provides a similar load.

The hole-insert fit is preferably at least 0.030 inches. It should be appreciated that the hole-insert fit may define the width of the gap between the insert and the portion of the crushing body that defines the hole in which the insert is positioned. Of course, other hole-insert fit ranges may be used, such as between 0.018 inches and 0.030 inches. For example, a gap width or hole-insert fit of 0.018, 0.020, 0.022, 0.024, 0.026, 0.028, or 0.030 inches may be used. In some applications, it is contemplated that less than 0.018 inches may be used for the hole-insert fit.

Routine experimentation or testing may be used to determine the specific parameters that may provide the best design for a particular application. For example, the design goals for a small repair or only one insert may be substantially different than the design goals for a repair of multiple inserts at the same time. As another example, different insert types and geometries may permit the use of different sleeve and hole geometries that may be desirable for a particular design objective, such as a cost consideration or other design consideration. That being said, numerous different options that fall within the disclosure provided herein may permit an operable design for most, if not all, potential industrial applications.

Figure 14:
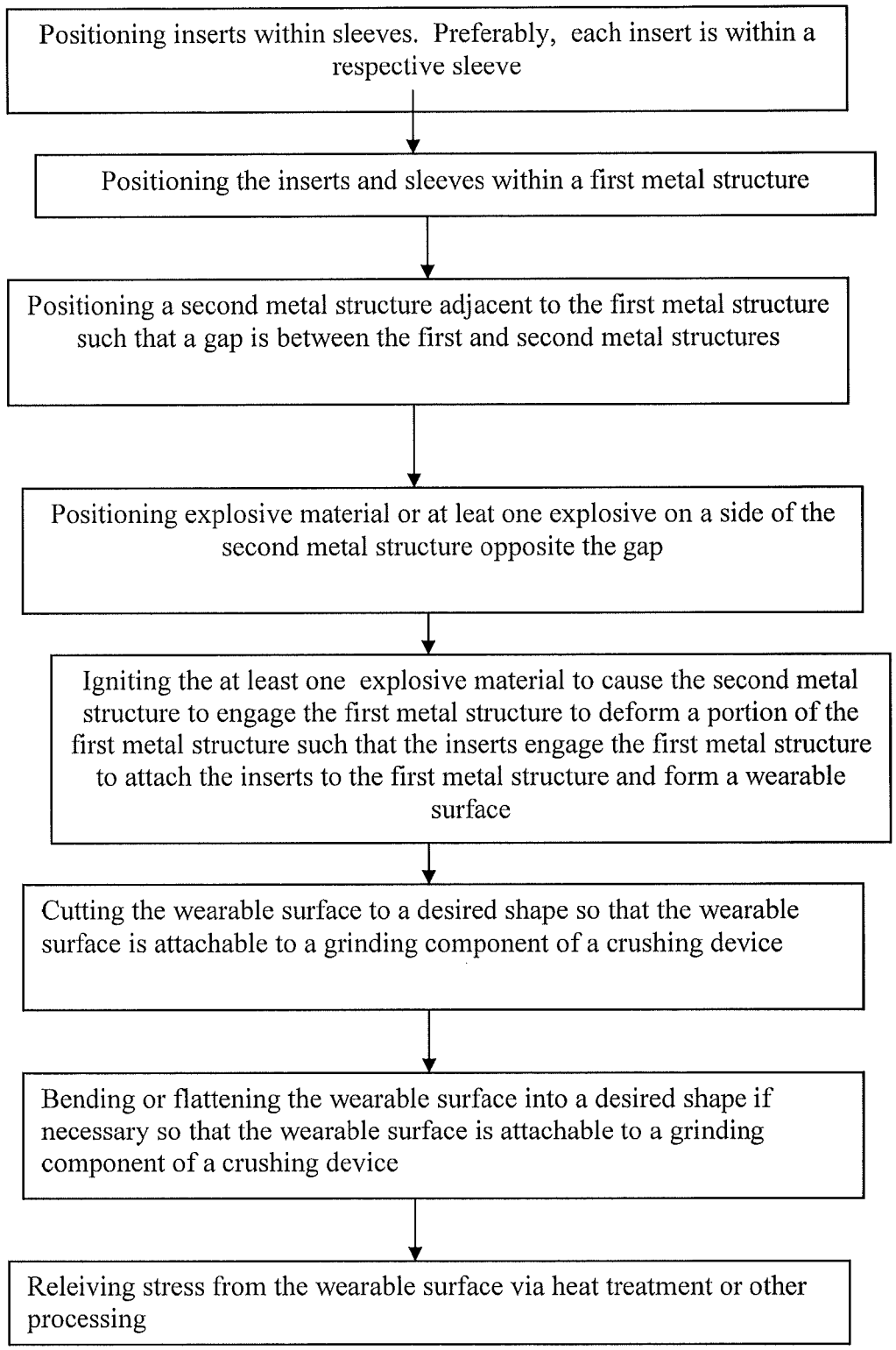
FIG. 14 is a flow chart illustrating a present preferred method of forming a crushing body of a device configured to comminute material.
Figure 15:
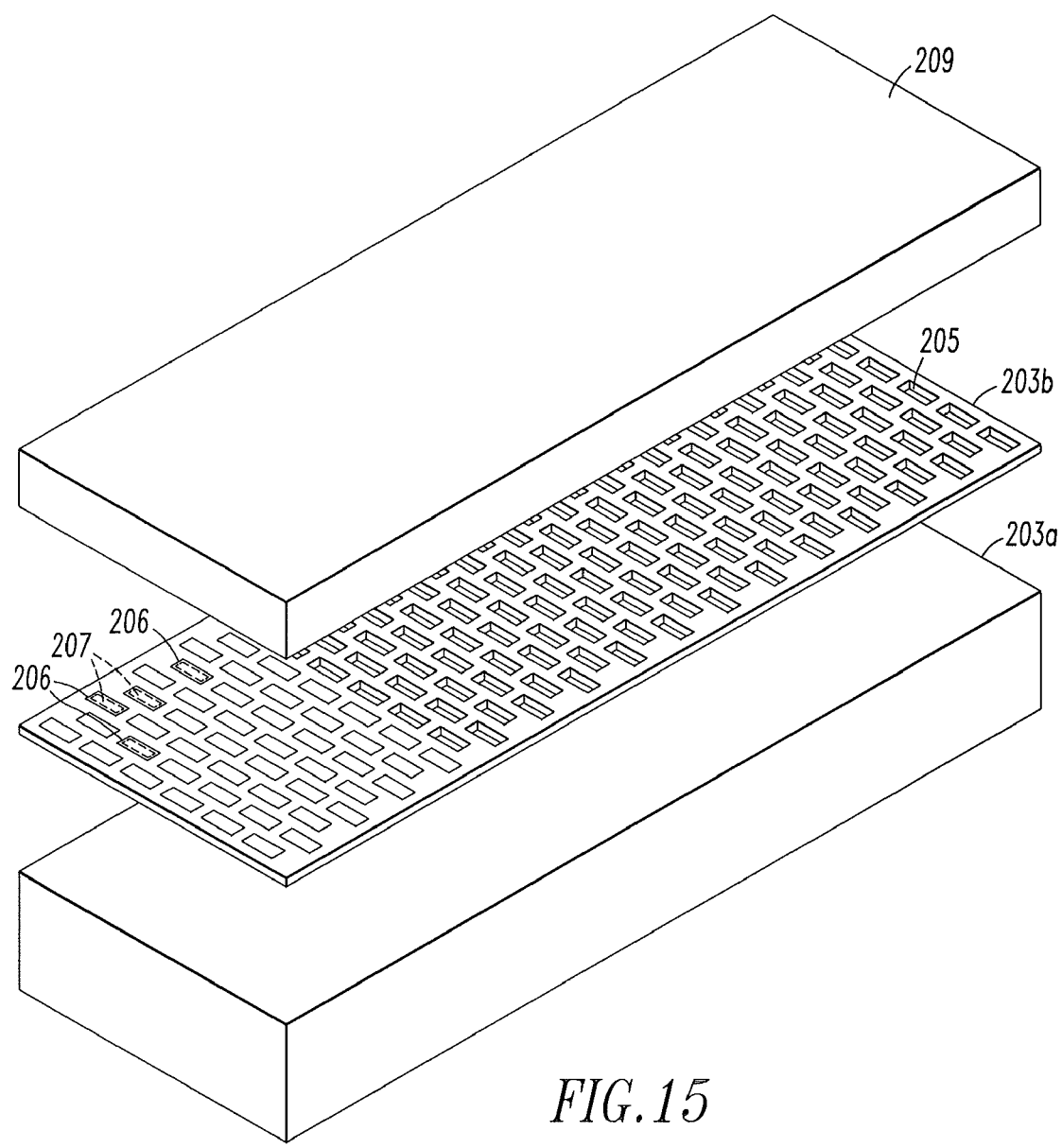
FIG. 15 is an exploded view illustrating a present preferred embodiment of a wearable surface for a crushing device adjacent to a second metal structure.

Referring to FIGS. 14 and 15, we have also contemplated embodiments of methods that may be used to form crushing bodies or wearable surfaces on crushing bodies. A wearable surface may be formed on a crushing body of a crushing device such as a roller mill, vertical roller mill, crusher, or grinding device. For example, a crushing body may include a base portion 203a and an outer portion 203b. The outer portion 203b may include recesses 205 that are sized and configured to receive insert members 207. Preferably, the outer portion 203b is integral with the base portion 203a or are portions of the same metal body or structure, such as a metal cylindrical structure.

The insert members 207 may be sized and configured such that each insert is wider than it is long or may be configured to be a square-like shape or may be configured to have different shapes and sizes. The insert members are preferably composed of tungsten carbide that have a cylindrical shape, conical shape or tapered shape. The inserts may include inserts of different shapes or sizes or all the inserts may be the same shape and size. The insert members may be composed of other hard materials, such as, for example, industrial made diamonds, diamonds, or other hard materials that are harder than the material of outer portion 3b.

The inserts are preferably harder than the outer portion 203b and base portion 203a. For example, the inserts preferably have a harder Brinell value, Rockwell value, Vickers value, Knoop value or Leeb Rebound value than the hardness rating of the crushing body, or the outer portion 3b of the crushing body. As another example, the inserts preferably have a harder durometer value than the crushing body or outer portion 3b of the crushing body.

Each insert 207 may be positioned in a sleeve 206 sized and configured to receive that insert 207. The sleeves 206 may be similar in structure and function to sleeves 69 discussed above. Each sleeve may include a cap attached to one end of the sleeve. The inserts and sleeves are sized and configured to at least be partially received within the recesses 205 formed in the outer portion 203b. Mortar such as high temperature mortar, cement, a binder, or an adhesive may be used to position the inserts and sleeves within the recesses 5 and bond the inserts to the crushing body. It should be appreciated that any adhesive that is commercially available, relatively low in cost, and relatively reliable may preferably be used. The inserts and sleeves may be positioned so that the entirety of each insert and sleeve is within a respective recess or may be positioned so that only a portion of the insert and sleeve are within the respective recess. Preferably, the inserts and sleeves are positioned in the recesses such that the outermost portions of the inserts and sleeves are recessed relative to the outermost portion of the outer portion 3b.

A second metal structure 209 may be positioned over the inserts 207, sleeves 206 and crushing body or adjacent to the inserts 207 and crushing body. For example, the second metal structure 209 may be positioned such that there is a gap between the crushing body and the second metal structure 209. The second metal structure 9 may be a flyer plate, a flyer tube, a driver plate, a driver tube, a driver pipe, or other metal structure. The inserts 207 are preferably harder than the second metal structure 9 and the material of the sleeves 206.

The outer portion 203b and the second metal structure 209 may be grinded prior to the positioning of these structures or prior to ignition of any explosives. The grinding may be used to remove scale or other surface defects from the surfaces of the metal structures.

Preferably, the second metal structure 209 is positioned adjacent to the inserts 207 and the crushing body such that there is a space formed between the second metal structure and the embedded inserts and outer portion 203b of the crushing body. The space may be maintained by positioning spacers between the outer portion 203b and the second metal structure. The spacers may define the size or width of the space. The width of the space may define a standoff size. In alternative embodiments, it is contemplated that the space may not exist such that the standoff distance, or standoff size, is 0.

One or more explosives or an explosive material may be positioned adjacent to the second metal structure. For instance, the second metal structure 209 may have a first side that faces toward the space and the outer portion 203b of the crushing body and a second side opposite the first side. The one or more explosives may be positioned adjacent to the second side of the second metal structure 209. For instance, the one or more explosives may be positioned on the second side of the second metal structure 209 or near the second side of the second metal structure 209. The one or more explosives such as for example, explosive material, may be obtained from suppliers or vendors of such materials.

It is contemplated that the one or more explosives may include explosive material that includes any number of suitable explosive materials or combination of explosive materials. For example, it is contemplated that explosive material that may be used could include ammonium nitrate, amatol, guanidine, dynamite, cyclonite, plastic explosives, explosive powder, ammonium nitrate/fuel oil (ANFO), EL819 type explosive material, T200 type explosive material or other explosive materials.

In some embodiments of the method, a cover plate or other structure may be positioned over a top of the second metal structure 209 and the crushing body. A portion of the one or more explosives or a different explosive may be positioned on the cover plate and be in contact with the one or more explosives positioned near the second metal structure as well.

Alternatively, the second metal structure and the crushing body may be arranged such that the second metal structure covers the top of the first metal structure so that no cover plate is needed or is otherwise used.

The explosives may be ignited to force the second metal structure 209 into contact with the outer portion 203b of the crushing body to deform the outer portion 203b of the crushing body to attach the inserts to the crushing body to form a wearable surface. The second metal structure 209 may be moved away from the crushing body that has the formed wearable surface after the deformation of the outer portion 203b is completed. For example, the second metal structure may be cut and then hit or impacted by a tool or machine to separate or remove the second metal structure 209 from the inserts and the crushing body. Alternatively the crushing body may be moved away from the second metal structure 209 or both structures may be moved away from each other. Preferably, the inserts are covered or encapsulated by a portion of the crushing body after the ignition of the explosive material due to a deformation of the crushing body caused by the force from the ignited one or more explosives that is transferred via the second metal structure 209.

Figure 16A:
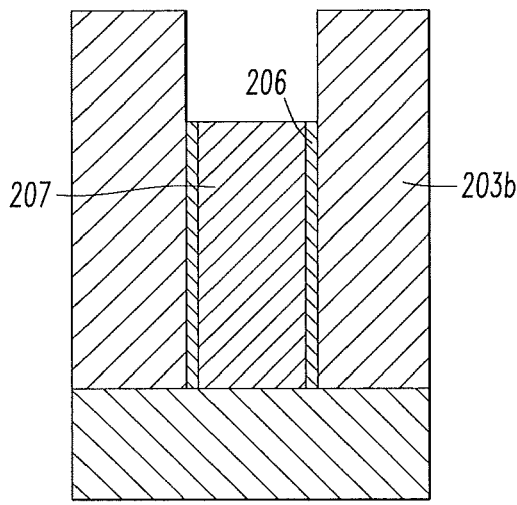
FIG. 16A is a fragmentary cross sectional view illustrating an insert positioned within a recess of the outer portion of a crushing body prior to the ignition of any explosive material.
Figure 16B:
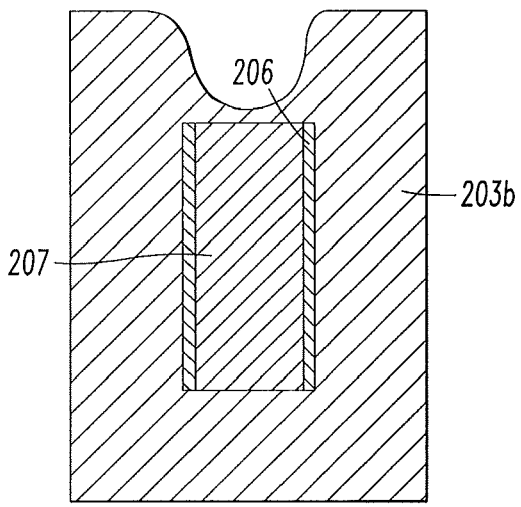
FIG. 16B is a fragmentary cross sectional view illustrating an insert positioned within a recess of the outer portion of a crushing body after explosive material was ignited and the second metal structure transferred force from the ignited explosives to the outer portion of the crushing body to deform a portion of the outer portion of the crushing body to fully encapsulate the insert for attaching the insert to the crushing body.
Figure 16C:
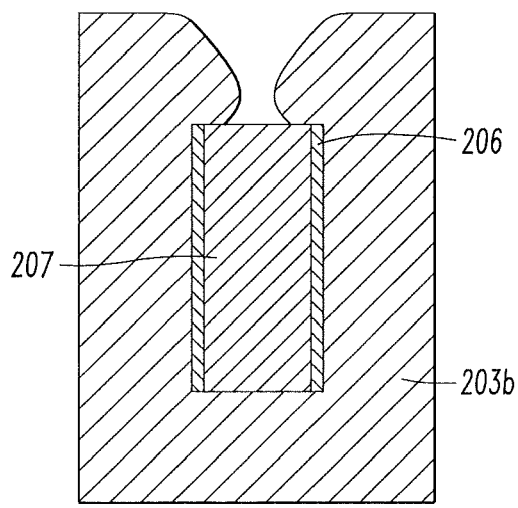
FIG. 16C is a fragmentary cross sectional view illustrating an insert positioned within a recess of the outer portion of a crushing body after explosive material was ignited and the second metal structure transferred force from the ignited explosives to the outer portion of the crushing body to deform a portion of the outer portion of the crushing body to partially encapsulate the insert for attaching the insert to the crushing body.

The deformation of the outer portion 203b may also cause the outer portion 203b to engage the inserts 207 or cause a mechanical interlock between the outer portion 203b and the inserts 207 and sleeves 206 to attach the inserts 207 to the outer portion 203b. Example of such deformation that occurs to attach the inserts 207 and sleeves 206 to the outer portion 203b of the crushing body may be appreciated from FIGS. 16A, 16B and 16C. The deformation caused by the ignition of the explosive material that provides an attachment of the inserts and sleeves to the outer portion 203b of the crushing body may be considered an explosive forging ("EXF") of the inserts to the outer portion 203b of the crushing body.

It should be appreciated that the ignited explosives do not cause explosion welding or other welding to occur between the inserts 207 and the outer portion 203b of the crushing body. No metallurgical bonding between the inserts 207 and the outer portion 203b may take place. Similarly, no metallurgical bonding between the inserts 207 and the sleeves 206 may take place It is contemplated that metallurgical bonding may occur between the sleeves 206 and the outer portion 203b of the crushing body. It should be appreciated that the existence and extent of any metallurgical bonding or intramolecular bonding that may take place between sleeves 206 and the outer portion 203b is dependent on the amount of force or energy applied via the detonated explosive material.

Of course, other variations of our method of forming wearable surfaces may also be appreciated by those of at least ordinary skill in the art. For instance, such sleeves may also be used to help position inserts within metal structures during explosive welding of different metal structures that may take place to form a wearable surface. Example of such embodiments of our method may be appreciated from U.S. patent application Ser. No. 12/766,110 (the entirety of which is incorporated by reference herein).

As will be understood by those of at least ordinary skill in the art, design parameters for use in different steps of the above mentioned methods may change to meet a particular design objective for repairing a particular device or forming a particular wearable surface of a crushing body. For example, the material properties of the metal of the crushing body and inserts being used and the size and shape of such structures may affect the desirable amount of explosive material to use or how a replacement insert should be positioned within an opening of a crushing body.

While certain present preferred methods of repairing or forming wearable surfaces of devices configured to comminute material and present preferred embodiments of such devices have been shown and described above, it is to be distinctly understood that the invention is not limited thereto but may be otherwise variously embodied and practiced within the scope of the following claims.

What is claimed is:

1. A method of repairing a device configured to comminute material comprising:
   removing at least one first insert from a portion of a crushing body such that at least one opening is formed in the portion of the crushing body, the portion of the crushing body comprised of metal, the at least one first insert being harder than the metal of the portion of the crushing body;
   positioning at least one second insert in the at least one opening formed by the removing of the at least one first insert, the at least one second insert being harder that the metal of the portion of the crushing body;
   positioning an explosive material adjacent to the at least one second insert and the portion of the crushing body;
   igniting the explosive material to deform the portion of the crushing body to attach the at least one second insert to the portion of the crushing body.

2. The method of claim 1 wherein the explosive material is comprised of at least one explosive.

3. The method of claim 2 wherein the explosive material is an explosive powder, a plastic explosive, a plasticite explosive material, an emulsion explosive material, a liquid explosive material, a castable form explosive material, a sheet form explosive material, or a solid explosive material.

4. The method of claim 1 further comprising wherein the at least one first insert is only one first insert and the at least one second insert is only one second insert.

5. The method of claim 1 wherein the at least one second insert is mechanically interconnected to the portion of the crushing body after the explosive material is ignited, the mechanical interconnection of the portion of the crushing body and the at least one second insert being formed such that there is no intramolecular bond between the at least one second insert and the portion of the crushing body; and
   wherein the portion of the crushing body is comprised of a portion of a wearable surface of the crushing body; and
   wherein the wearable surface is configured to comminute material, the material being at least one of rock, ore, minerals, stone and agglomerated material.

6. The method of claim 1 further comprising positioning the at least one second insert in at least one sleeve assembly prior to the positioning of the at least one second insert in the at least one opening formed by the removing of the at least one first insert, the at least one sleeve assembly sized and configured to be positioned within the at least one opening.

7. The method of claim 6 wherein the positioning of the at least one second insert in the at least one opening formed by the removing of the at least one first insert is performed such that at least one gap is formed between the at least one sleeve and the portion of the crushing body.

8. The method of claim 1 wherein the positioning of the at least one second insert in the at least one opening formed by the removing of the at least one first insert is performed such that a gap is formed between each second insert and the portion of the crushing body adjacent that second insert in each of the at least one opening.

9. The method of claim 8 wherein each gap has a width of between 0.0625 inches and 0.125 inches.

10. The method of claim 9 wherein the removal of the at least one first insert is at least partially performed by at least one of drilling, chiseling or hammering and wherein the sleeve assembly is comprised of a sleeve and a cap attached adjacent to an end of the sleeve.

11. The method of claim 1 wherein the explosive material is an explosive material and the method further comprises positioning an ignition mechanism adjacent to the explosive material, the ignition mechanism configured to detonate the explosive material after the ignition mechanism is actuated.

12. The method of claim 1 wherein the crushing body is a roller of a roller mill, a roller of a roller press, a liner of a cone crusher, a bowl of a cone crusher, a die of a mill, a table of a mill, or a crushing body of a crushing device that is configured to impact material to comminute the material.

13. The method of claim 1 wherein the removing at least one first insert from a portion of a crushing body, the positioning at least one second insert in the at least one opening formed by the removing of the at least one first insert, the positioning of the explosive material adjacent to the at least one second insert and the portion of the crushing body; and the igniting of the explosive material are performed while the device configured to comminute material is positioned in a material processing facility, manufacturing facility or in a crushing circuit of a manufacturing process.

14. The method of claim 1 further comprising providing a localized stress relief to the portion of the crushing body after the explosive material is ignited and the at least one second insert is attached to the crushing body.

15. The method of claim 14, wherein the localized stress relief is provided via a thermal pad, the thermal pad being controlled to provide heat treatment to a local area of the crushing body adjacent to the at least one second insert.

16. The method of claim 1 further comprising covering the explosive material with a shield such that the shield is able to direct a force provided by the ignited explosive material, the shield being positioned to direct the force or energy provided by the explosive material toward the portion of the crushing body.

17. The method of claim 16 wherein the shield is comprised of at least one of metal and a material capable of absorbing at least a portion of sound emitted after the explosive material is detonated.

18. The method of claim 17 further comprising moving the shield away from the crushing body after the explosive material is detonated.

19. The method of claim 1 wherein the portion of the crushing body is integral with the crushing body and is a portion of a wearable surface of the crushing body.

20. A method of forming a wearable surface for a device configured for material comminution comprising:
   positioning inserts at least partially within sleeves;
   positioning the inserts and sleeves adjacent to a first metal structure, the inserts being harder than the first metal structure;
   positioning a second metal structure adjacent to the inserts, sleeves, and the first metal structure such that there is a gap between the second metal structure and the first metal structure, the second metal structure having a first side facing toward the gap and a second side opposite the first side;
   positioning at least one explosive material adjacent to the second side of the second metal structure; and
   igniting the at least one explosive material to deform a portion of the first metal structure to attach the inserts and sleeves to the first metal structure to form the wearable surface.

21. The method of claim 20 wherein the inserts are attached to the first metal structure such that no intramolecular bonding between the first metal structure and the inserts take place.

22. The method of claim 21 wherein intramolecular bonding or metallurgical bonding between the sleeves and the first metal structure occurs via the ignited at least one explosive material.

23. The method of claim 20 further comprising moving the second metal structure away from the wearable surface; and
   wherein the first metal structure is a plate, a tube, or a generally cylindrical structure and the second metal structure is a plate, a tube, or a generally cylindrical structure and wherein the second metal structure is moved away from the wearable surface by at least one of cutting and hitting the second metal structure to move the second metal structure away from the wearable surface.

24. The method of claim 20 further comprising at least one of cutting the wearable surface to a desired shape, bending the wearable surface into a desired shape, flattening the wearable surface into a desired shape, and testing the wearable surface, the at least one of cutting, bending, flattening and testing configured to permit the wearable surface to be attached to a grinding component of the device.

25. A method of repairing a device configured to comminute material comprising:
   removing at least one first insert from a portion of a crushing body such that at least one opening is formed in the portion of the crushing body, the portion of the crushing body comprised of metal, the at least one first insert being harder than the metal of the portion of the crushing body;

positioning at least one second insert in the at least one opening formed by the removing of the at least one first insert, the at least one second insert being harder that the metal of the portion of the crushing body;

positioning a force application mechanism adjacent to the at least one second insert and the portion of the crushing body;

actuating the force application mechanism to deform the portion of the crushing body to attach the at least one second insert to the portion of the crushing body.

26. The method of claim 25 wherein the deformation of the portion of the crushing body is a plastic deformation of the portion of the crushing body.

* * * * *